United States Patent
Takahashi et al.

(10) Patent No.: US 10,116,542 B2
(45) Date of Patent: Oct. 30, 2018

(54) COMMUNICATION DEVICE, COMMUNICATION METHOD, PROGRAM, AND COMMUNICATION SYSTEM

(71) Applicant: Sony Corporation, Tokyo (JP)

(72) Inventors: Hiroo Takahashi, Kanagawa (JP); Takashi Yokokawa, Kanagawa (JP); Tatsuya Sugioka, Tokyo (JP); Naohiro Koshisaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/914,230

(22) Filed: Mar. 7, 2018

(65) Prior Publication Data

US 2018/0198695 A1 Jul. 12, 2018

Related U.S. Application Data

(63) Continuation of application No. 15/087,408, filed on Mar. 31, 2016, now Pat. No. 9,960,981.

(30) Foreign Application Priority Data

Oct. 8, 2015 (JP) ................................ 2015-200442

(51) Int. Cl.
  *H04L 12/26* (2006.01)
  *H04L 12/933* (2013.01)
  (Continued)

(52) U.S. Cl.
  CPC ........ *H04L 43/0847* (2013.01); *H04L 1/0063* (2013.01); *H04L 1/0083* (2013.01); *H04L 47/806* (2013.01); *H04L 49/102* (2013.01)

(58) Field of Classification Search
  CPC . H04L 43/0847; H04L 47/806; H04L 1/0063; H04L 49/102; H04L 1/0083
  See application file for complete search history.

(56) References Cited

U.S. PATENT DOCUMENTS

| 4,091,445 A | 5/1978 | Ryan |
| 5,128,666 A | 7/1992 | Munier et al. |

(Continued)

FOREIGN PATENT DOCUMENTS

| JP | 57-025026 A | 2/1982 |
| JP | 2000-099448 A | 4/2000 |

(Continued)

OTHER PUBLICATIONS

International Search Report (ISA/210) dated Nov. 16, 2016, for corresponding International Application No. PCT/JP2016/078980.

*Primary Examiner* — Mounir Moutaouakil
(74) *Attorney, Agent, or Firm* — Michael Best & Friedrich LLP

(57) ABSTRACT

There is provided a communication device that performs communication through a bus, including: a transmitting and receiving unit configured to transmit and receive a signal to and from at least one other communication device; and an error detection unit configured to, when the transmitting and receiving unit transmits and receives the signal, detect whether an error has occurred in the signal using a specific error detection method according to transmission and reception of the signal. The signal is transmitted and received between a first communication device, which is the communication device having a communication initiative through the bus, and a second communication device, which is the communication device configured to perform communication under control of the first communication device.

21 Claims, 19 Drawing Sheets

(51) Int. Cl.
*H04L 1/00* (2006.01)
*H04L 12/927* (2013.01)

(56) References Cited

U.S. PATENT DOCUMENTS

| | | |
|---|---|---|
| 6,611,537 B1 | 8/2003 | Edens et al. |
| 6,906,618 B2 | 6/2005 | Hair et al. |
| 7,924,174 B1 * | 4/2011 | Gananathan ......... H05B 37/029 |
| | | 315/149 |
| 8,705,548 B2 | 4/2014 | Meyer-Grafe |
| 9,298,379 B2 | 3/2016 | Flanagan et al. |
| 2003/0149819 A1 * | 8/2003 | Smith ................. G06F 13/4291 |
| | | 710/100 |
| 2008/0209262 A1 * | 8/2008 | Maity .................. G06F 9/4416 |
| | | 714/6.11 |
| 2012/0131422 A1 | 5/2012 | Shinbashi et al. |
| 2015/0100862 A1 | 4/2015 | Sengoku |
| 2015/0293812 A1 | 10/2015 | Roberts |
| 2017/0041127 A1 * | 2/2017 | Sharpe-Geisler ..... H04L 7/0012 |

FOREIGN PATENT DOCUMENTS

| | | |
|---|---|---|
| JP | 2002-175269 A | 6/2002 |
| JP | 2005-346669 A | 12/2005 |

* cited by examiner

COMMUNICATION DEVICE, COMMUNICATION METHOD, PROGRAM, AND COMMUNICATION SYSTEM

CROSS REFERENCE TO RELATED APPLICATIONS

The present application is a Continuation of application Ser. No. 15/087,408, filed Mar. 31, 2016, which claims the benefit of Japanese Priority Patent Application JP 2015-200442 filed Oct. 8, 2015, the entire contents of which are incorporated herein by reference.

BACKGROUND

The present disclosure relates to a communication device, a communication method, a program, and a communication system, and specifically, to a communication device, a communication method, a program, and a communication system through which it is possible to perform communication more reliably.

In the related art, as a bus interface (IF) used for communication between devices through a bus in a board in which a plurality of devices are installed, for example, I2C (Inter-Integrated Circuit) is broadly used. In addition, in recent years, it is necessary to implement I2C at high speeds, and the standardization of I3C (Improved Inter Integrated Circuit) as a next generation standard is in progress.

For example, JP 2000-99448A discloses a digital data processing system in which a host processor and a sub-system controller are connected to each other according to I2C. In addition, JP 2002-175269A discloses a method of implementing a communication protocol arranged in a layer above a standard I2C protocol.

SUMMARY

When an error has occurred in a signal that is transmitted and received between devices configured to perform communication through a bus, if there is a device that is unable to detect occurrence of the error and continues to perform communication, the device is assumed to erroneously detect communication start and stop. In this case, the device has a possibility of communication failure and has difficulty performing communication reliably.

In view of such problems, an embodiment of the present disclosure makes it possible to perform communication more reliably.

According to an embodiment of the present disclosure, there is provided a communication device that performs communication through a bus, including: a transmitting and receiving unit configured to transmit and receive a signal to and from at least one other communication device; and an error detection unit configured to, when the transmitting and receiving unit transmits and receives the signal, detect whether an error has occurred in the signal using a specific error detection method according to transmission and reception of the signal. The signal is transmitted and received between a first communication device, which is the communication device having a communication initiative through the bus, and a second communication device, which is the communication device configured to perform communication under control of the first communication device. When one bit indicating a data read or write request, which is transmitted together with a broadcast command for notifying of simultaneous transmission of a command to all of a plurality of the second communication devices as a target, indicates data read in a first word of a head in a frame transmitted after the first communication device starts communication, the error detection unit of the second communication device detects that an error has occurred in the first word.

According to an embodiment of the present disclosure, there is provided a communication method performed by a communication device configured to perform communication through a bus, or a program causing a computer of a communication device configured to perform communication through a bus to execute operations. The communication device includes a transmitting and receiving unit configured to transmit and receive a signal to and from at least one other communication device, and an error detection unit configured to, when the transmitting and receiving unit transmits and receives the signal, detect whether an error has occurred in the signal using a specific error detection method according to transmission and reception of the signal. The communication method or the operations include transmitting and receiving the signal between a first communication device, which is the communication device having a communication initiative through the bus, and a second communication device, which is the communication device configured to perform communication under control of the first communication device; and when one bit indicating a data read or write request, which is transmitted together with a broadcast command for notifying of simultaneous transmission of a command to all of a plurality of the second communication devices as a target, indicates data read in a first word of a head in a frame transmitted after the first communication device starts communication, detecting by the error detection unit of the second communication device that an error has occurred in the first word.

According to an embodiment of the present disclosure, there is provided a communication system in which a plurality of communication devices perform communication through a bus. The communication devices each include a transmitting and receiving unit configured to transmit and receive a signal to and from at least one other communication device, and an error detection unit configured to, when the transmitting and receiving unit transmits and receives the signal, detect whether an error has occurred in the signal using a specific error detection method according to transmission and reception of the signal. The signal is transmitted and received between a first communication device, which is the communication device having a communication initiative through the bus, and a second communication device, which is the communication device configured to perform communication under control of the first communication device. When one bit indicating a data read or write request, which is transmitted together with a broadcast command for notifying of simultaneous transmission of a command to all of a plurality of the second communication devices as a target, indicates data read in a first word of a head in a frame transmitted after the first communication device starts communication, the error detection unit of the second communication device detects that an error has occurred in the first word.

In an embodiment of the present disclosure, a communication device includes: a transmitting and receiving unit configured to transmit and receive a signal to and from at least one other communication device; and an error detection unit configured to, when the transmitting and receiving unit transmits and receives the signal, detect whether an error has occurred in the signal using a specific error detection method according to transmission and reception of the signal. The signal is transmitted and received between a first communication device, which is the communication device having a communication initiative through the bus, and a second communication device, which is the communication device configured to perform communication under control of the first communication device. When one bit indicating a data read or write request, which is transmitted together with a broadcast command for notifying of simultaneous transmission of a command to all of a plurality of the second communication devices as a target, indicates data read in a first word of a head in a frame transmitted after the first communication device starts communication, the error detection unit of the second communication device detects that an error has occurred in the first word.

According to an embodiment of the present disclosure, it is possible to perform communication more reliably.

DETAILED DESCRIPTION OF THE EMBODIMENT(S)

Hereinafter, specific embodiments to which the present technology is applied will be described in detail with reference to the drawings.

<Exemplary Configuration of Bus IF>

Figure 1:
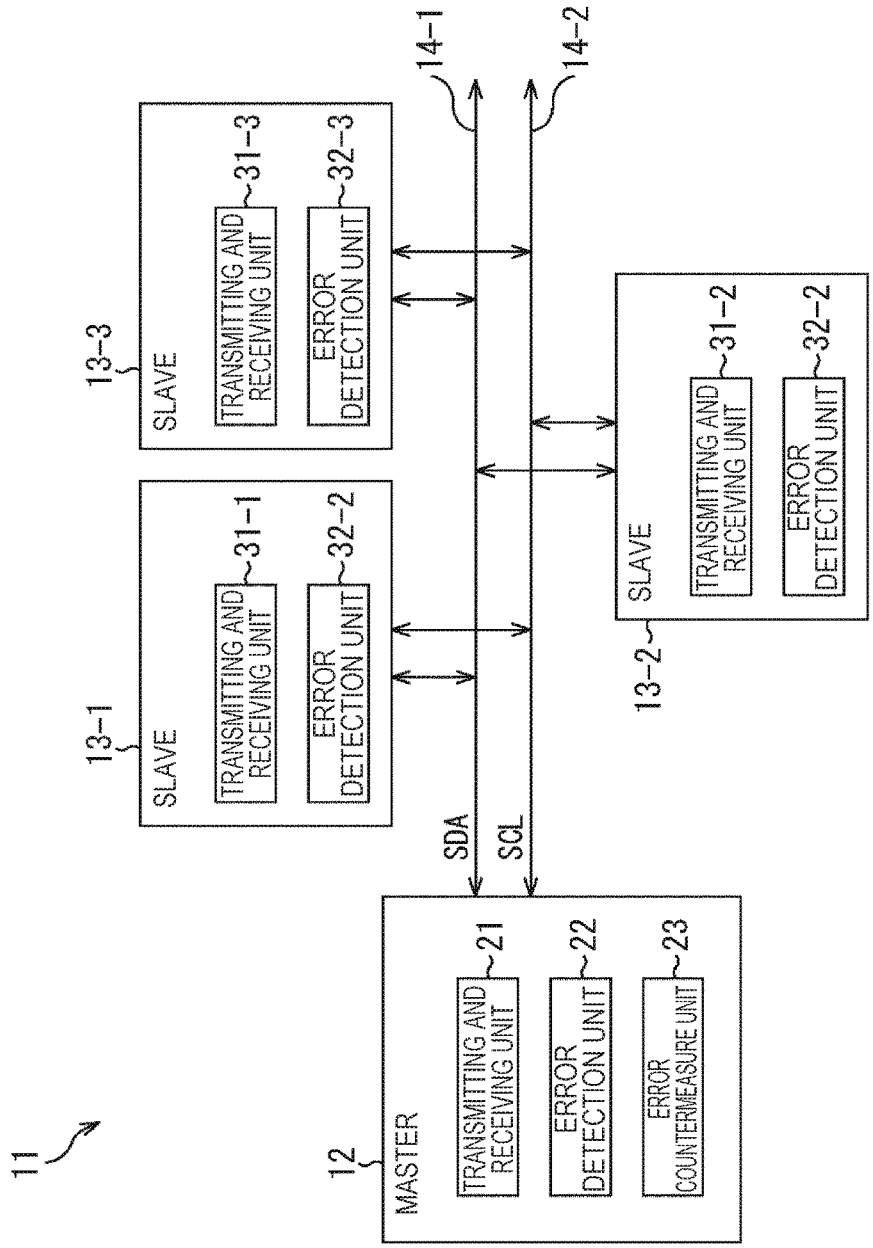
FIG. 1 is a block diagram illustrating an exemplary configuration of an embodiment of a bus IF to which the present technology is applied.

FIG. 1 is a block diagram illustrating an exemplary configuration of an embodiment of a bus IF to which the present technology is applied.

In a bus IF 11 illustrated in FIG. 1, a master 12 and three slaves 13-1 to 13-3 are connected through two signal lines 14-1 and 14-2. In addition, a plurality of transmission schemes having different communication rates are defined in the bus IF 11. The master 12 can switch such transmission schemes. For example, in the bus IF 11, depending on a transfer rate of data, a standard data rate (SDR) at which data is transmitted at a general transfer rate and a high data rate (HDR) at which data is transmitted at a transfer rate higher than the SDR are defined.

The master 12 has a control initiative in the bus IF 11, and performs communication with the slaves 13-1 to 13-3 through the signal lines 14-1 and 14-2.

As illustrated, the master 12 includes a transmitting and receiving unit 21, an error detection unit 22, and an error countermeasure unit 23.

The transmitting and receiving unit 21 transmits and receives a signal to and from the slaves 13-1 to 13-3 through the bus IF 11.

When the transmitting and receiving unit 21 transmits and receives a signal, the error detection unit 22 detects whether an error has occurred in the transmitted and received signal using a specific error detection method according to transmission and reception of the signal. For example, the error detection unit 22 detects an error that has occurred in a predetermined part of the signal received by the transmitting and receiving unit 21 using an error detection method for each predetermined part. In addition, the error detection unit 22 detects an error that has occurred due to collision of the signal transmitted by the transmitting and receiving unit 21 using an error detection method in which the signal line 14-1 is monitored.

The error countermeasure unit 23 performs an error countermeasure for enabling detection of an error in the slave 13. That is, as will be described below, in the error countermeasure unit 23, for example, predetermined address is prohibited from being used in a first word of a frame transmitted after communication starts, and a range in which a parity check is performed by a one-bit parity is set to include two words from the frame transmitted after communication starts.

The slaves 13-1 to 13-3 can perform communication with the master 12 through the signal lines 14-1 and 14-2 under control of the master 12. Also, the slaves 13-1 to 13-3 have the same configuration. Hereinafter, when it is unnecessary to distinguish the slaves, these are simply called the slave 13, and this is similarly applied to blocks of the slave 13.

As illustrated, the slave 13 includes a transmitting and receiving unit 31 and an error detection unit 32.

The transmitting and receiving unit 31 transmits and receives a signal to and from the transmitting and receiving unit 21 of the master 12 through the bus IF 11.

When the transmitting and receiving unit 31 transmits and receives a signal, the error detection unit 32 detects whether an error has occurred in the transmitted and received signal using a specific error detection method according to transmission and reception of the signal. For example, the error detection unit 32 detects an error that has occurred in a predetermined part of the signal received by the transmitting and receiving unit 31 using an error detection method for each predetermined part. In addition, the error detection unit 32 detects an error that has occurred due to collision of the signal transmitted by the transmitting and receiving unit 31 using an error detection method in which the signal line 14-1 is monitored.

The signal lines 14-1 and 14-2 are used to transmit a signal between the master 12 and the slave 13. For example, serial data (SDA) is sequentially transmitted bit by bit through the signal line 14-1, and a serial clock (SCL) of a predetermined frequency is transmitted through the signal line 14-2.

In the bus IF 11 having such a configuration, the master 12 can simultaneously transmit data to all of the slaves 13-1 to 13-3 as targets and can individually transmit data by designating an address of the slaves 13-1 to 13-3.

Therefore, as described above, the master 12 and the slave 13 can switch the transmission scheme to the SDR or the HDR, and transmit and receive data.

Figure 2:
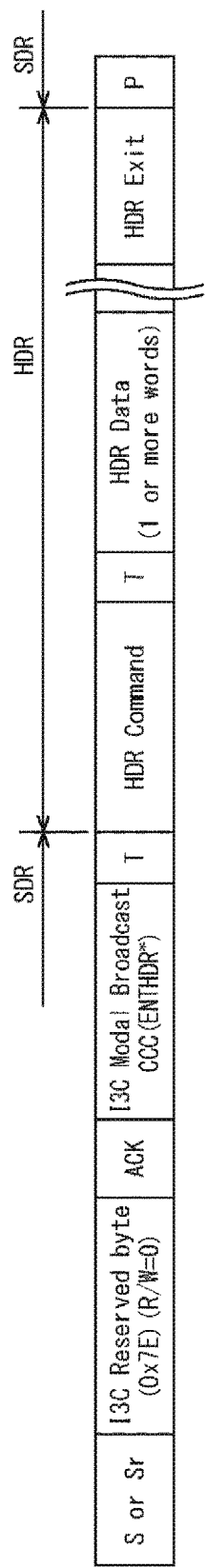
FIG. 2 is a diagram illustrating an example in which a transmission scheme is switched from an SDR to an HDR and data is transmitted.

For example, FIG. 2 illustrates an example in which, in the bus IF 11, the transmission scheme is switched from the SDR to the HDR and data is transmitted.

First, the master 12 outputs a start condition S or Sr to the slaves 13-1 to 13-3 through the bus IF 11 and declares communication start. For example, both of the SDA and the SCL are at an H level in a waiting state in which no communication is performed in the bus IF 11, and the master 12 changes the SDA from the H level to an L level while the SCL is at the H level, and thus outputs the start condition. Note that the transmission scheme when communication starts is set as the SDR.

Therefore, the master 12 transmits a broadcast command (I3C Reserved byte) for notifying of simultaneous transmission of a command to all of the slaves 13-1 to 13-3 as targets in a first word of a frame head, and subsequently confirms whether reception is successful using an acknowledge (ACK). For example, when the broadcast command is completely received, each of the slaves 13-1 to 13-3 returns the ACK (for example, 0 of one bit) as a reception completion notification. Therefore, when the ACK is returned, the master 12 confirms that the broadcast command is successfully received.

Then, the master 12 transmits a common command code (I3C Modal Broadcast CCC (ENTHDR)) for indicating switch of the transmission scheme to the HDR in a second word from the frame head to the slaves 13-1 to 13-3, and subsequently transmits a one-bit parity T. The one-bit parity is used to detect an error of the common command code in the slaves 13-1 to 13-3.

In this manner, after the common command code for indicating switch of the transmission scheme to the HDR is transmitted, the master 12 starts data transmission at the HDR, and transmits an HDR command or HDR data. Then, in order to terminate transmission using the HDR, the master 12 transmits an HDR exit command (HDR Exit) for indicating release from the HDR.

Then, the master 12 outputs a stop condition P to the slaves 13-1 to 13-3 through the bus IF 11, and declares communication termination. For example, the master 12 changes the SDA from the L level to the H level while the SCL is at the H level and thus sets the bus IF 11 to the stop condition. Note that, in the bus IF 11, when the SDR is used, the SDA is defined not to be changed when the SCL is at the H level, except that communication start or termination is declared.

When any of the slaves 13-1 to 13-3 is unable to normally receive the common command code, the slave 13 is unable to recognize that the transmission scheme is transited to the HDR. Therefore, when the slave 13 that has failed to recognize the transition of the transmission scheme to the HDR incorrectly interprets data to be transmitted at the HDR, a negative influence is caused in the bus IF 11 and a state in which secure communication is not possible is assumed.

That is, when a one-bit error has occurred in two words (0x7E+R/W+CCC [ENTHDR]) of the frame head in the specific slave 13, only the slave 13 continues to maintain the SDR. Therefore, the slave 13 is assumed to erroneously detect the start condition S or Sr or the stop condition P, and it is difficult to perform communication reliably.

Hereinafter, a method in which, when an error has occurred in the particularly important two words of the frame head, the error is detected will be proposed, and a new method for performing restoration safely when the master 12 or the slave 13 detects the error in the two words of the frame head will be proposed. Further, an error detection method in which an error that has occurred in parts other than the two words of the frame head is detected will be proposed. In addition, when the slave 13 shows no reaction, a method of delivering the HDR exit command (HDR Exit) and the stop condition P is proposed as a method of the master 12 restoring the slave 13. Also, in the present embodiment, occurrence of only a one-bit error is assumed for description.

Note that, hereinafter, an error detection method in which the slave 13 detects an error using only a parity check of the second word without detecting an error in the first word will be appropriately referred to as an error detection method S0 of the slave 13.

<First Error Detection Method on Slave Side>

A first error detection method performed by the slave 13 is a method of detecting an error that has occurred in two words (9 bits×2) of the frame head in a mode in which a signal is transmitted at the SDR.

For example, as described above with reference to FIG. 2, when the transmission scheme is switched from the SDR to the HDR and data is transmitted, the master 12 sets the bus IF 11 to the start condition and then transmits the broadcast command. In this case, in the bus IF 11, as illustrated in FIG. 2, in a bit stream transmitted in the first word of the frame head, 7 bits (0x7E) indicating the broadcast command and R/W=0 indicating write in one bit indicating a data read or write request are defined.

Therefore, the error detection unit 32 of the slave 13 confirms whether a bit stream in which any one bit among the bit stream (0x7E+R/W=0:111_1110_0) to be transmitted in the first word of the frame head is reversed is arranged in the first word. Then, when it is confirmed that such a bit stream is arranged in the first word, the error detection unit 32 can detect that an error has occurred in the first word of the frame head.

In addition, the error detection unit 32 of the slave 13 performs a parity check using the one-bit parity T transmitted following the common command code (I3C Modal Broadcast CCC) in the second word of the frame head, and thus can detect that an error has occurred.

In this manner, the first error detection method performed by the slave 13 is a method of detecting occurrence of an error. The error is detected in the first word of the frame head when a bit stream (0x3E+R/W=0:011_1110_0), a bit stream (0x5E+R/W=0:101_1110_0), a bit stream (0x6E+R/W=0:110_1110_0), a bit stream (0x76+R/W=0:111_0110_0), a bit stream (0x7A+R/W=0:111_1010_0), a bit stream (0x7C+R/W=0:111_1100_0), a bit stream (0x7F+R/W=0:111_1111_0), and a bit stream (0x7E+R/W=1:011_1110_1), which are 8 possible combinations of a one-bit error of the bit stream (0x7E+R/W=0:111_1110_0), are received. The error is detected in the second word of the frame head according to a parity check result.

Note that, hereinafter, among the first error detection methods by the slave 13, a method in which 7 bit streams (0x3E, 0x5E, 0x6E, 0x76, 0x7A, 0x7C, and 0x7F) in which any one bit of 7 bits (0x7E) indicating the broadcast command to be transmitted in the first word of the frame head is reversed are received and thus an error is detected will be appropriately referred to as an error detection method S0a of the slave 13.

In this case, in order to implement the error detection method S0a of the slave 13, the error countermeasure unit 23 of the master 12 prohibits these 7 bit streams (0x3E, 0x5E, 0x6E, 0x76, 0x7A, 0x7C, and 0x7F) from being used as an address to be dynamically assigned.

In addition, hereinafter, among the first error detection methods by the slave 13, a method in which the bit stream (0x7E+R/W=1:011_1110_1) in which one bit (R/W=0) to be finally transmitted in the first word of the frame head is reversed is received and thus an error is detected will be appropriately referred to as an error detection method S0b of the slave 13.

Here, as will be described below with reference to FIG. 6, the bit stream (0x7E+R/W=1:011_1110_1) is defined to be used only when an address to be dynamically assigned (dynamic address assignment (DAA)) is set. Therefore, when the bit stream (0x7E+R/W=1:011_1110_1) is detected before the dynamically assigned address is fixed, it is considered as an error.

As described above, compared to the above error detection method S0, in the first error detection method performed by the slave 13, it is also possible to detect an error that has occurred in one bit indicating a data read or write request.

<Second Error Detection Method on Slave Side>

A second error detection method performed by the slave 13 is a method in which an error that has occurred in two words (9 bit×2) of the frame head is detected in a mode in which a signal is transmitted at the SDR, similarly to the first error detection method.

For example, as described above with reference to FIG. 2, the one-bit parity T is transmitted following the common command code (I3C Modal Broadcast CCC) transmitted in the second word of the frame head. In the related art, a range in which a parity check is performed by the one-bit parity T is set to include only the common command code (I3C Modal Broadcast CCC).

Here, the error countermeasure unit 23 of the master 12 sets a bit stream of the two words including the broadcast command and the common command code to be included in a range in which a parity check is performed by the one-bit parity transmitted following the common command code transmitted in the second word of the frame head.

Accordingly, the error detection unit 32 of the slave 13 can detect an error that has occurred in the broadcast command and the common command code using the second error detection method in which the one-bit parity transmitted following the common command code of the second word from the frame head is used to perform a parity check on the bit stream of two words from the frame head.

As described above, compared to the above first error detection method, in the second error detection method performed by the slave 13, it is possible to prevent available addresses (for example, 0x3E, 0x5E, 0x6E, and 0x76) from being limited.

Note that, hereinafter, the second error detection method performed by the slave 13 will be appropriately referred to as an error detection method S0c of the slave 13.

<Third Error Detection Method on Slave Side>

A third error detection method performed by the slave 13 is a method in which an error that has occurred in one word (0x7E+R/W=1) immediately after communication is continuously re-started (Sr) without terminating communication is detected until communication termination is detected after the dynamically assigned address is fixed in a mode in which a signal is transmitted in DAA within the SDR (CCC).

For example, as will be described below with reference to FIG. 6, in communication through the bus IF 11, one word (0x7E+R/W=1) immediately after communication is continuously re-started without terminating communication after dynamic address assignment is detected until communication termination is detected appears only in this part.

Therefore, the error detection unit 32 of the slave 13 confirms whether the bit stream (0x7E+R/W=1) that is predefined to be transmitted as one word is arranged in the one word transmitted immediately after communication is continuously re-started without terminating communication after dynamic address assignment is detected until communication termination is detected. Therefore, when it is confirmed that the bit stream (0x7E+R/W=1) is arranged in the one word immediately after communication is re-started, the error detection unit 32 can determine that no error occurred. On the other hand, when it is confirmed that the bit stream (0x7E+R/W=1) is not arranged in the one word, that is, a bit stream other than the bit stream is arranged, it can be considered that an error has occurred in the one word immediately after communication is re-started.

As described above, in the third error detection method performed by the slave 13, it is possible to detect an error that has occurred in the one word, which is not detected using methods in the related art, immediately after communication is continuously re-started without terminating communication after dynamic address assignment is detected until communication termination is detected.

Note that, hereinafter, the third error detection method performed by the slave 13 will be appropriately referred to as an error detection method S3a of the slave 13.

<Fourth Error Detection Method on Slave Side>

A fourth error detection method performed by the slave 13 is a method in which, in a mode in which a signal is transmitted at the SDR (CCC), after a transaction of transmitting the common command code (CCC) to the plurality of slaves 13 is fixed, an error that has occurred in data transmitted from the master 12 is detected.

That is, after the transaction of transmitting the common command code is fixed, transmission and reception of data having a format predefined by a standard are determined. Therefore, the error detection unit 32 of the slave 13 confirms whether a format of data transmitted after the transaction of transmitting the common command code is fixed is different from the predefined format. When data having a different format is received by the transmitting and receiving unit 31, it can be determined that an error has occurred.

For example, after the transaction of the common command code is fixed, when read/write is 1 that indicates read regardless of a data write-related instruction (refer to FIG. 4 to be described below), the error detection unit 32 determines that data having a format different from the predefined format is received and can detect that an error has occurred.

Similarly, when read/write is 0 that indicates write regardless of a data read-related instruction, the error detection unit 32 can detect that an error has occurred when data having a format different from the predefined format is received. In addition, the error detection unit 32 can detect that an error has occurred when third words are received against an instruction to receive two words.

Note that, hereinafter, the fourth error detection method performed by the slave 13 will be appropriately referred to as an error detection method S5a of the slave 13.

<Fifth Error Detection Method on Slave Side>

A fifth error detection method performed by the slave 13 is a method in which, at a timing at which a signal is delivered from the slave 13, it is constantly monitored whether the delivered signal matches a signal in the signal line 14-1, and thus an error is detected.

For example, the bus IF 11 allows an interrupt process according to the standard. Therefore, when the interrupt process is performed, if a transmission signal from the master 12 and an interrupt request from the slave 13 are generated at the same time, the signal encounters collision in the signal line 14-1. In order to manage such signal collision, arbitration is defined. That is, in such an interval, it is necessary to compare a signal transmitted by itself with a signal flowing on the bus and monitor advantages and disadvantages of bus rights.

Here, for example, the master 12 transfers private write, but the slave 13 erroneously recognizes it as private read due to a reception error. In this case, there is signal collision in the signal line 14-1 between write data transmitted by the master 12 and read data transmitted by the slave 13. Accordingly, it is difficult to perform communication accurately.

Therefore, in the fifth error detection method performed by the slave 13, at a timing at which a signal is delivered from the slave 13, the error detection unit 32 constantly monitors (that is, including the above arbitration part, and the other parts) whether the delivered signal matches a signal in the signal line 14-1. Accordingly, the error detection unit 32 can detect occurrence of an error due to data collision.

<Sixth Error Detection Method on Slave Side>

A sixth error detection method performed by the slave 13 is a method in which, at a timing at which a signal is delivered from the slave 13, it is determined whether the delivered signal matches a signal in the signal line 14-1 by constantly monitoring a current flowing in the signal line 14-1 and thus an error is detected.

Here, in order to monitor the current, a collision detection circuit 74 illustrated in FIG. 15 to be described below is used. Therefore, at a timing at which a signal is delivered from the slave 13, the error detection unit 32 constantly monitors (that is, including the above arbitration part, and the other parts) whether the delivered signal matches a signal in the signal line 14-1 based on a current value. Accordingly, the error detection unit 32 can detect occurrence of an error due to data collision.

For example, in the fifth error detection method performed by the slave 13, between the master 12 and the slave 13 that transmit a signal, only one can detect collision, and it is difficult for both to detect collision. For example, when the signal line 14-1 has an intermediate potential, both of the master 12 and the slave 13 are assumed to fail detection.

Therefore, like the collision detection circuit 74 illustrated in FIG. 15 to be described below, by constantly monitoring whether a current exceeding assumption in an analog manner flows, both of the master 12 and the slave 13 can detect collision.

Note that, hereinafter, the fifth and sixth error detection methods by the slave 13 will be appropriately referred to as the error detection method S0a of the slave 13.

<First Error Detection Method on Master Side>

Similarly to the above fourth error detection method performed by the slave 13, the first error detection method performed by the master 12 is a method in which, in a mode in which a signal is transmitted at the SDR (CCC), after the transaction of transmitting the common command code (CCC) to the plurality of slaves 13 is fixed, the error detection unit 22 of the master 12 detects an error that has occurred in data transmitted from the slave 13.

That is, the error detection unit 22 of the master 12 confirms whether a format of data transmitted after the transaction of transmitting the common command code is fixed is different from the predefined format. When data having a different format is received by the transmitting and receiving unit 21, it can be determined that an error has occurred.

Note that, hereinafter, the first error detection method performed by the master 12 will be appropriately referred to as an error detection method M0a of the master 12.

<Second and Third Error Detection Methods on Master Side>

Similarly to the above fifth and sixth error detection methods by the slave 13, second and third error detection methods by the master 12 are methods in which an error is detected by constantly monitoring a signal in the signal line 14-1.

That is, the error detection unit 22 of the master 12 detects an error by, at a timing at which a signal is delivered from the master 12, constantly monitoring (that is, including the above arbitration part, and the other parts) whether the delivered signal matches a signal in the signal line 14-1. In addition, the collision detection circuit 74 illustrated in FIG. 15 to be described below is used to constantly monitor a current flowing in the signal line 14-1 and thus an error is detected.

Note that, hereinafter, the second and third error detection methods by the master 12 will be appropriately referred to as an error detection method M30a of the master 12.

When the master 12 and the slave 13 detect an error using the error detection methods described above, in the bus IF 11, for example, it is possible to reliably switch the transmission scheme and perform communication more reliably. Accordingly, it is possible to perform communication more securely.

<Restoration Method after Error Detection>

Hereinafter, a method in which the master 12 and the slave 13 perform restoration after the error is detected as described above will be described.

The master 12 and the slave 13 adaptively perform operations thereafter according to an error state, and can restore communication reliably.

For example, when an error is detected using the error detection method S0 of the slave 13, the error detection method S0b of the slave 13, and the error detection method S0c of the slave 13 described above, in consideration of communication failure, the slave 13 that has detected an error completely ignores communication until the HDR exit command (HDR Exit) is detected. Accordingly, when the transmission scheme is the HDR, it is possible to prevent the stop condition P from being erroneously detected. Then, it is possible to resume communication.

In addition, within the error detection method S0b of the slave 13, a process of the second word is not performed. That is, when no 0x7E is transmitted and the dynamically assigned address is transmitted, it is possible to perform error detection to a certain degree although an error detection rate is limited. In this case, since the transmission scheme is the SDR, the slave 13 that has detected an error completely ignores communication until the stop condition P is detected. Accordingly, only a frame in which an error has occurred is ignored and it is possible to resume communication.

In addition, when an error is detected using the error detection method S3a of the slave 13 and the error detection method S5a of the slave 13 described above, since the transmission scheme is the SDR, the slave 13 that has detected an error completely ignores communication until the stop condition P is detected. Accordingly, only a frame in which an error has occurred is ignored and it is possible to resume communication.

Also, if the transmission scheme is the SDR, when an error is detected using an error detection method S1 of the slave 13 in which an error that has occurred in write data is detected by a parity check and an error detection method S2 of the slave 13 in which an error that has occurred in the assigned address is detected by a parity check after the dynamically assigned address is fixed, similarly, the slave 13 that has detected an error completely ignores communication until the stop condition P is detected.

In addition, in a mode in which a signal is transmitted in an HDR-DDR, when an error is detected using an error detection method S10 of the slave 13 in which an error that has occurred in a command word is detected by a parity check and an error detection method S11 of the slave 13 in which an error that has occurred in a data word is detected by a parity check or a cyclic redundancy check (CRC), since it is in an HDR state, the slave 13 that has detected an error completely ignores communication until the HDR exit command (HDR Exit) is detected. Accordingly, only a frame in which an error has occurred is ignored and it is possible to resume communication.

In addition, in a mode in which a signal is transmitted in an HDR-TSL/TSP, when an error is detected using an error detection method S20 of the slave 13 in which an error that has occurred in a command word is detected by a symbol of "2" that is shown two consecutive times (other than HDR Restart or HDR Exit) and an error detection method S21 of the slave 13 in which an error that has occurred in a data word is detected by a parity check or a symbol of "2" that is shown two consecutive times (other than HDR Restart or HDR Exit), similarly, since it is in an HDR state, the slave 13 that has detected an error completely ignores communication until the HDR exit command (HDR Exit) is detected. Accordingly, only a frame in which an error has occurred is ignored and it is possible to resume communication.

In addition, when an error is detected using an error detection method S30a of the slave 13 described above, since a high current is consumed due to signal collision, the slave 13 that has detected an error immediately stops signal transmission, and completely ignores communication until the stop condition P is detected (HDR Exit is detected in HDR). Accordingly, only a frame in which an error has occurred is ignored and it is possible to resume communication.

In addition, when an error is detected using the error detection method M0a of the master 12 described above, since the transmission scheme is the SDR, the master 12 that has detected an error stops transmission and restarts communication from the beginning after the stop condition P is transmitted. Accordingly, only a frame in which an error has occurred is ignored and it is possible to resume communication.

In addition, when an error is detected using the error detection method M30a of the master 12 described above, since a high current is consumed due to signal collision, the master 12 that has detected an error immediately stops signal transmission, and after the stop condition P is transmitted (HDR Exit is transmitted in HDR), restarts communication from the beginning. Accordingly, only a frame in which an error has occurred is ignored and it is possible to resume communication.

<Error Detection Method for Each of Various Types of Communication>

An error detection method applied for each of various types of communication illustrated in FIGS. 3 to 14 will be described below.

Figure 3:
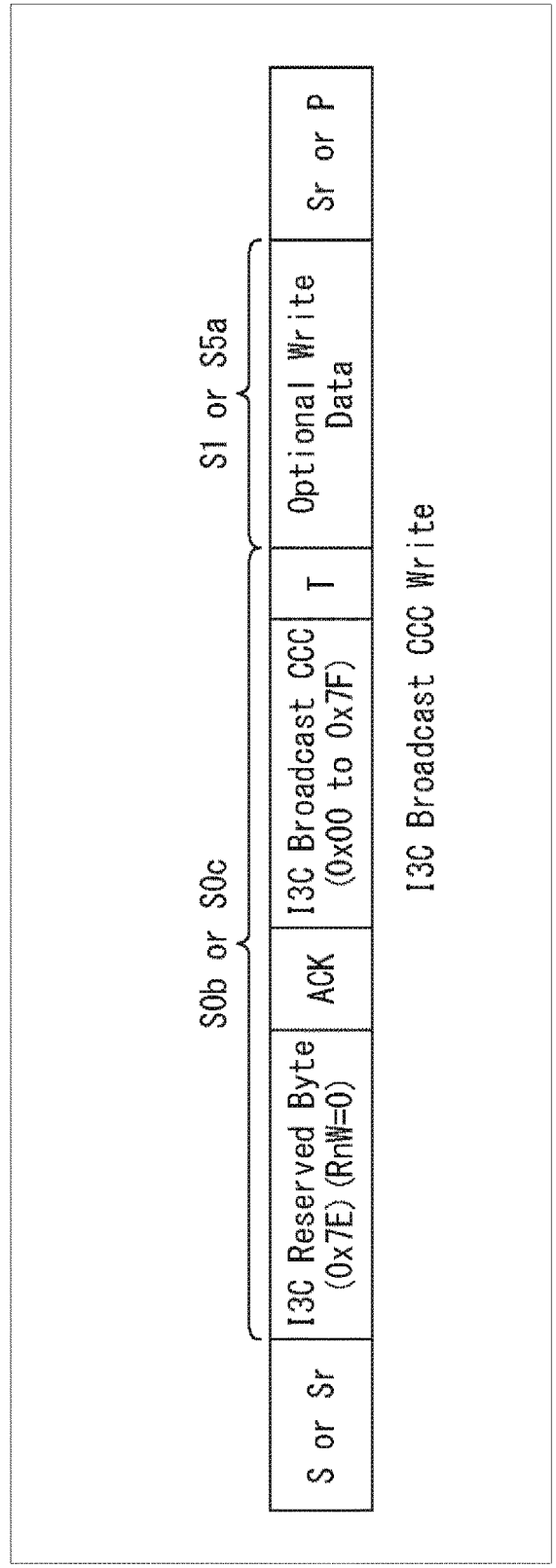
FIG. 3 is a diagram illustrating an error detection method when data write CCC communication is simultaneously performed for a plurality of slaves.

FIG. 3 illustrates an error detection method when data write communication (I3C Broadcast CCC Write) is simultaneously performed for the plurality of slaves 13.

In such communication, an error that has occurred in two words of the frame transmitted following the start condition can be detected by the error detection method S0b of the slave 13 and the error detection method S0c of the slave 13 described above.

In addition, an error that has occurred in data (Optional Write Data) transmitted after the one-bit parity can be detected by the error detection method S1 of the slave 13 and the error detection method S5a of the slave 13 described above.

Figure 4:
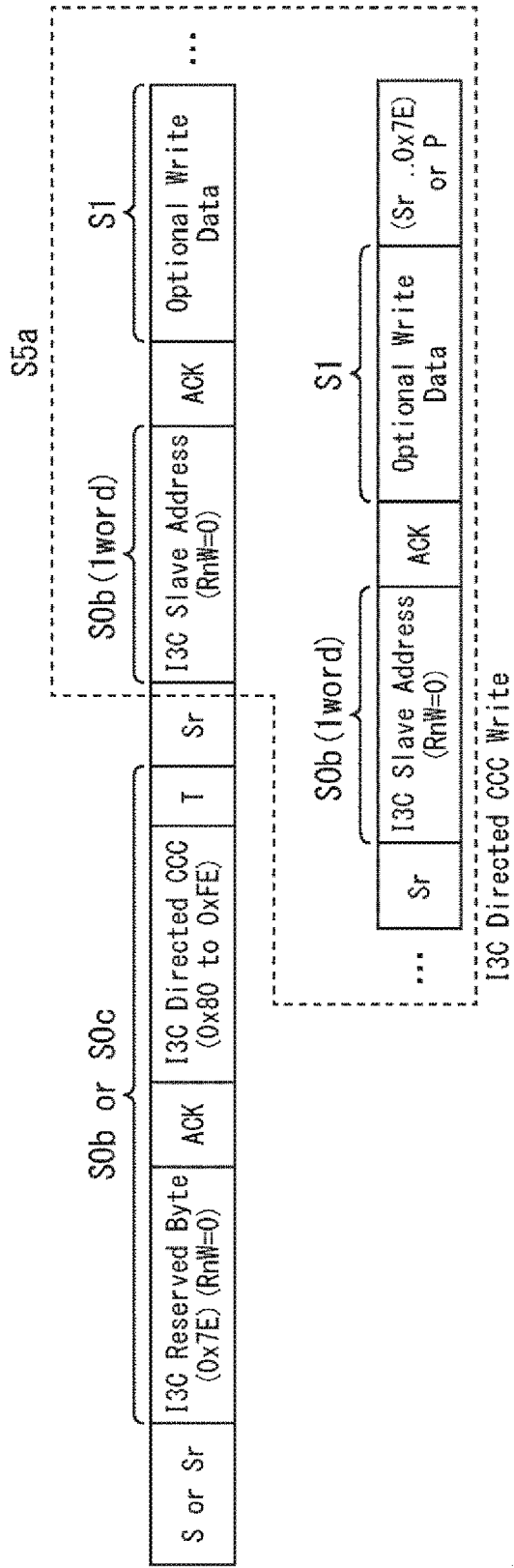
FIG. 4 is a diagram illustrating an error detection method when data write CCC communication is performed by designating an address for each slave.

FIG. 4 illustrates an error detection method when data write communication (I3C Directed CCC Write) is performed by designating an address for each slave 13.

In such communication, an error that has occurred in two words of the frame transmitted following the start condition can be detected by the error detection method S0b of the slave 13 and the error detection method S0c of the slave 13 described above.

In addition, an error that has occurred in all parts surrounded by a dashed line can be detected by the error detection method S5a of the slave 13 described above. Further, an error that has occurred in one word immediately after the restart Sr can be detected by the process corresponding to the first word of the error detection method S0b of the slave 13 described above. In addition, an error that has occurred in the data (Optional Write Data) can be detected by a parity check using the error detection method S1 of the slave 13 described above.

Figure 5:
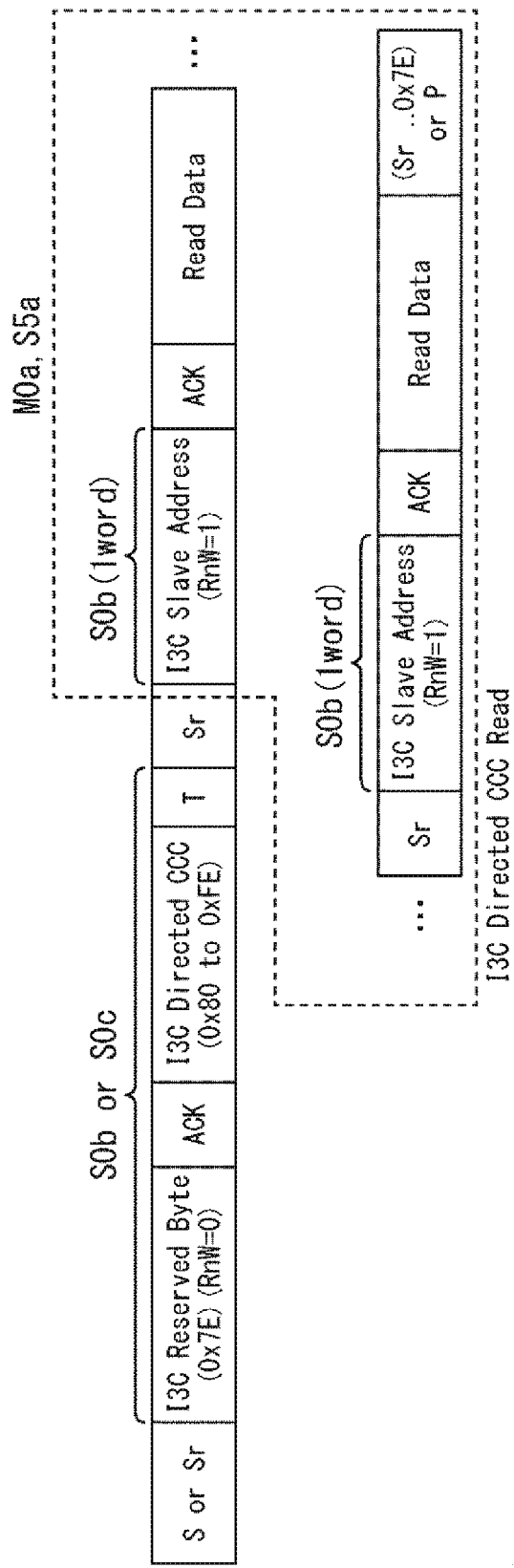
FIG. 5 is a diagram illustrating an error detection method when data read CCC communication is performed by designating an address for each slave.

FIG. 5 illustrates an error detection method when data read communication (I3C Directed CCC Read) is performed by designating an address for each slave 13.

In such communication, an error that has occurred in two words of the frame transmitted following the start condition can be detected by the error detection method S0b of the slave 13 and the error detection method S0c of the slave 13 described above.

In addition, an error that has occurred in all parts surrounded by a dashed line can be detected by the error detection method S5a of the slave 13 and the error detection method M0a of the master 12 described above. Further, an error that has occurred in one word immediately after the restart Sr can be detected by the process corresponding to the first word of the error detection method S0b of the slave 13 described above.

Figure 6:
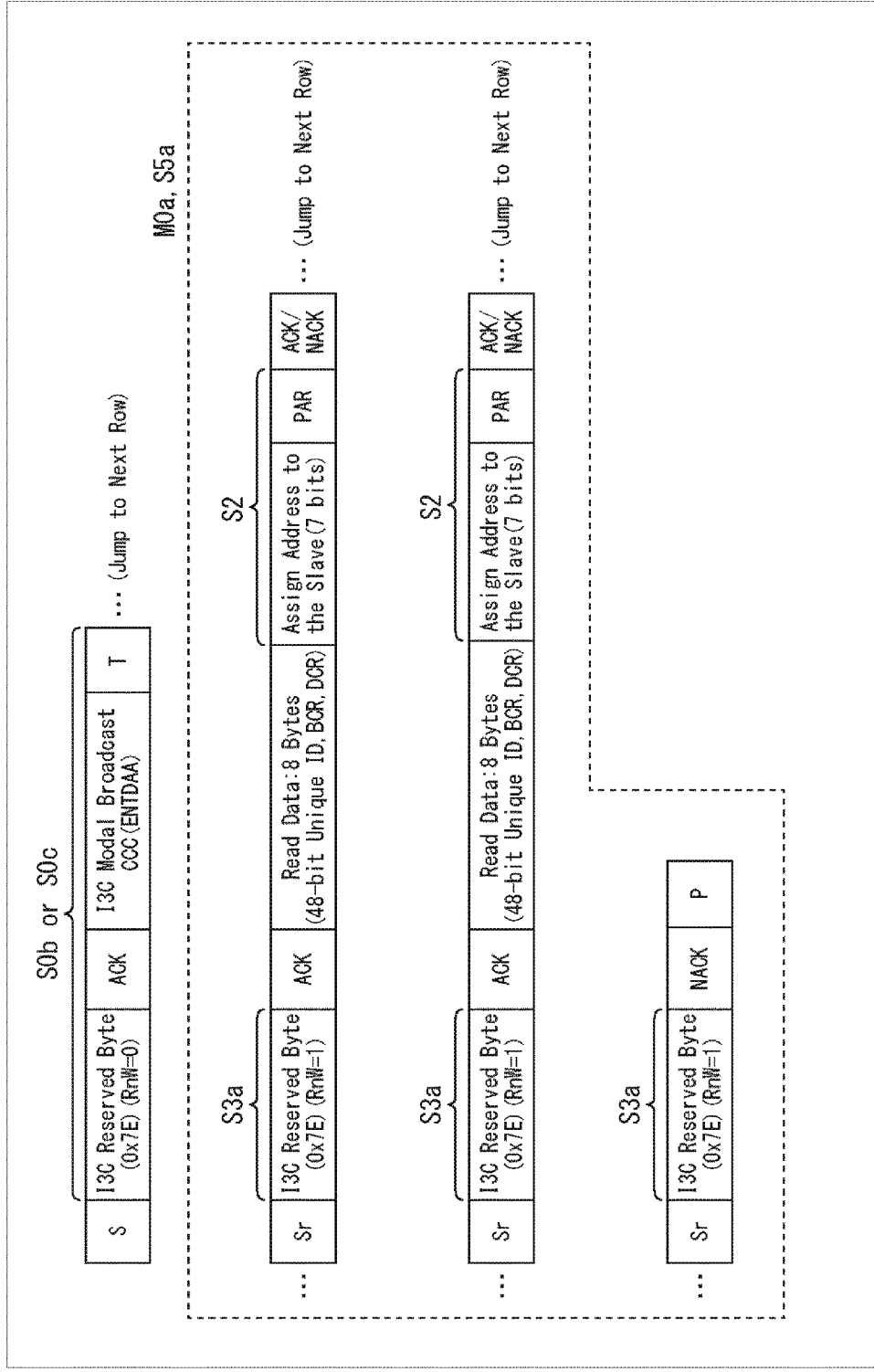
FIG. 6 is a diagram illustrating an error detection method when communication is performed using CCC (ENTDAA)

FIG. 6 illustrates an error detection method when communication is performed using CCC (ENTDAA).

In such communication, an error that has occurred in two words of the frame transmitted following the start condition can be detected by the error detection method S0b of the slave 13 and the error detection method S0c of the slave 13 described above.

In addition, an error that has occurred in all parts surrounded by a dashed line can be detected by the error detection method S5a of the slave 13 and the error detection method M0a of the master 12 described above. Further, an error that has occurred in one word immediately after the restart Sr can be detected by the error detection method S3a of the slave 13 described above. An error that has occurred in the assigned address can be detected by the error detection method S2 of the slave 13 described above.

Figure 7:
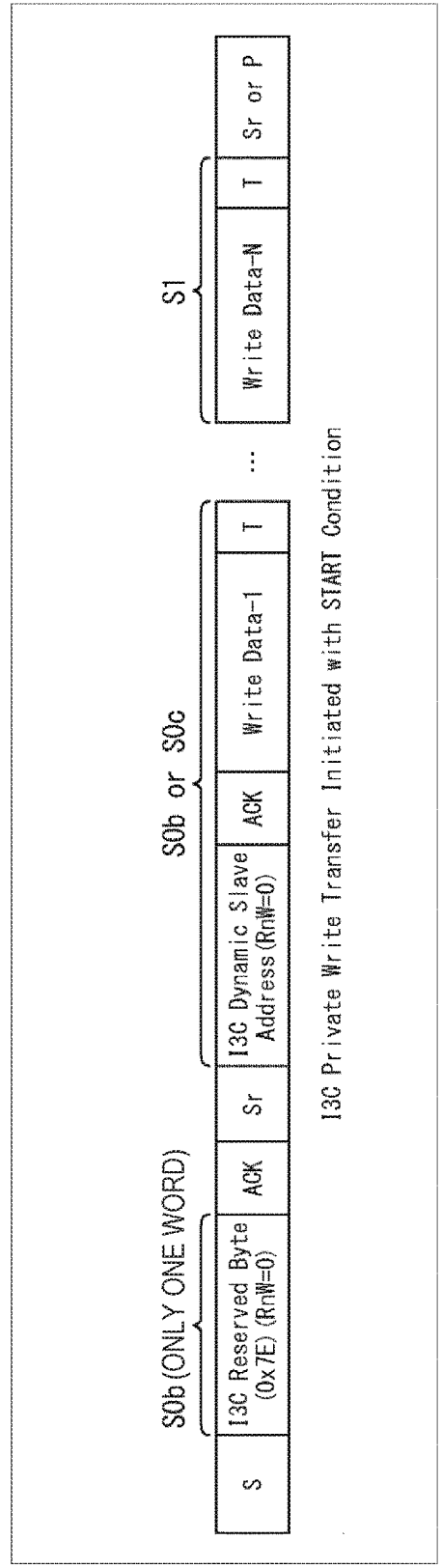
FIG. 7 is a diagram illustrating an error detection method when private write transfer communication initiated with a start condition is performed.

FIG. 7 illustrates an error detection method when private write transfer communication (I3C Private Write Transfer Initiated with START Condition) initiated with a start condition is performed.

In such communication, an error that has occurred in one word of the frame transmitted following the start condition can be detected by the process corresponding to the first word of the error detection method S0b of the slave 13 described above.

In addition, an error that has occurred in two words of the frame transmitted following the restart Sr can be detected by the error detection method S0b of the slave 13 and the error detection method S0c of the slave 13 described above. Further, an error that has occurred in data (Write Data-N) can be detected by a parity check using the error detection method S1 of the slave 13 described above.

Figure 8:
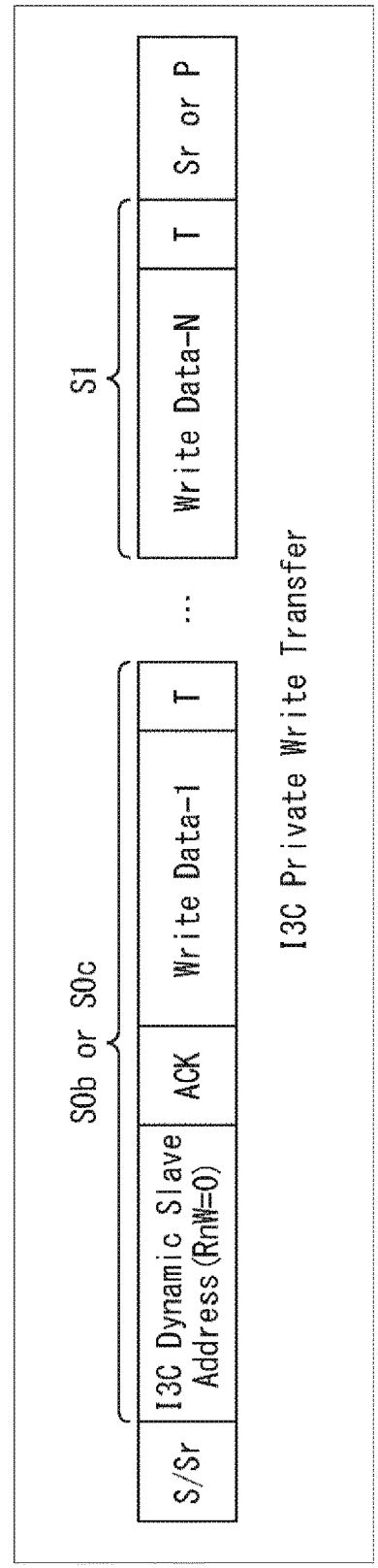
FIG. 8 is a diagram illustrating an error detection method when private write transfer communication is performed.

FIG. 8 illustrates an error detection method when private write transfer communication (I3C Private Write Transfer) is performed.

In such communication, an error that has occurred in one word of the frame transmitted following the start condition can be detected by the error detection method S0b of the slave 13 and the error detection method S0c of the slave 13 described above. Further, an error that has occurred in data (Write Data-N) can be detected by a parity check using the error detection method S1 of the slave 13 described above.

Figure 9:
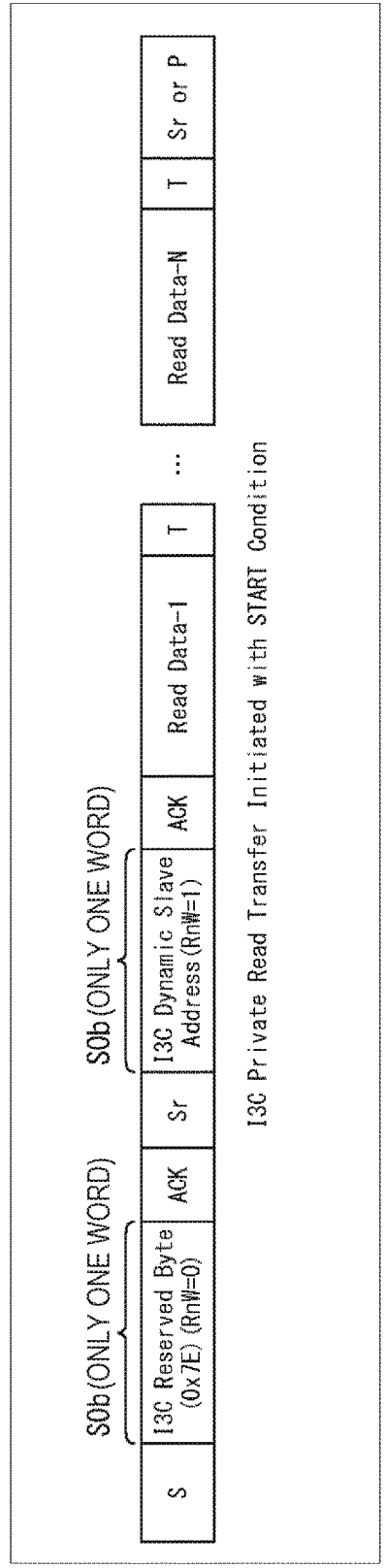
FIG. 9 is a diagram illustrating an error detection method when private read transfer communication initiated with a start condition is performed.

FIG. 9 illustrates an error detection method when private read transfer communication (I3C Private Read Transfer Initiated with START Condition) initiated with a start condition is performed.

In such communication, an error that has occurred in one word of the frame transmitted following the start condition can be detected by the process corresponding to the first word of the error detection method S0b of the slave 13 described above. In addition, an error that has occurred in one word immediately after the restart Sr can be detected by the process corresponding to the first word of the error detection method S0b of the slave 13 described above.

Figure 10:
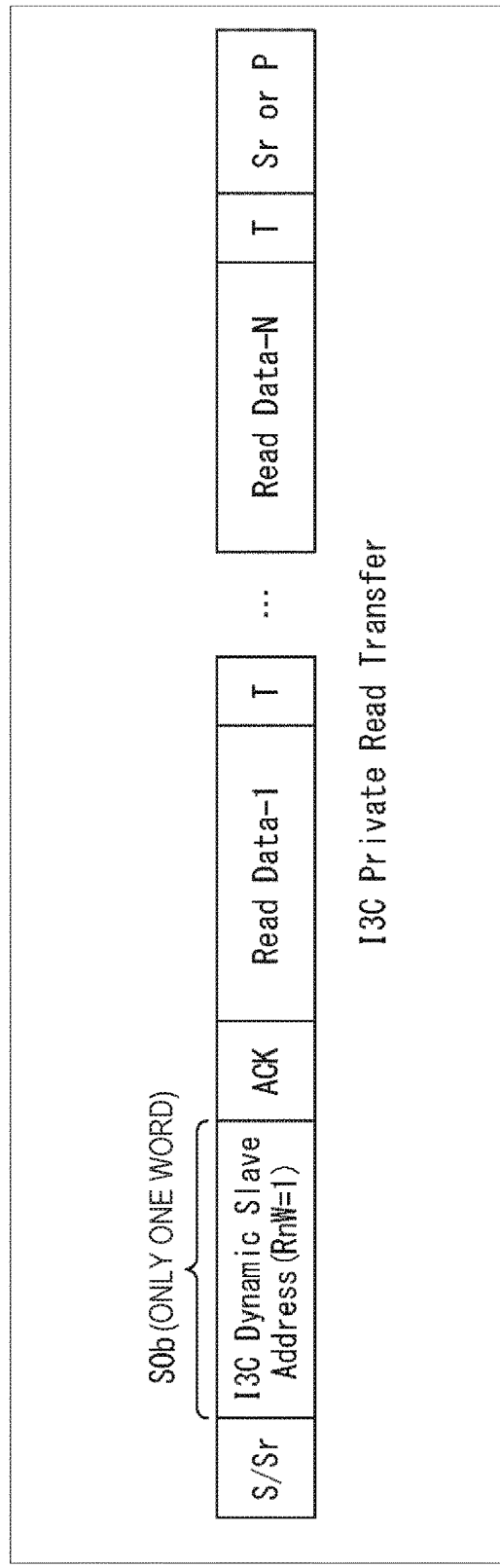
FIG. 10 is a diagram illustrating an error detection method when private read transfer communication is performed.

FIG. 10 illustrates an error detection method when private read transfer communication (I3C Private Read Transfer) is performed.

In such communication, an error that has occurred in one word of the frame transmitted following the start condition can be detected by the process corresponding to the first word of the error detection method S0b of the slave 13 described above.

Figure 11:
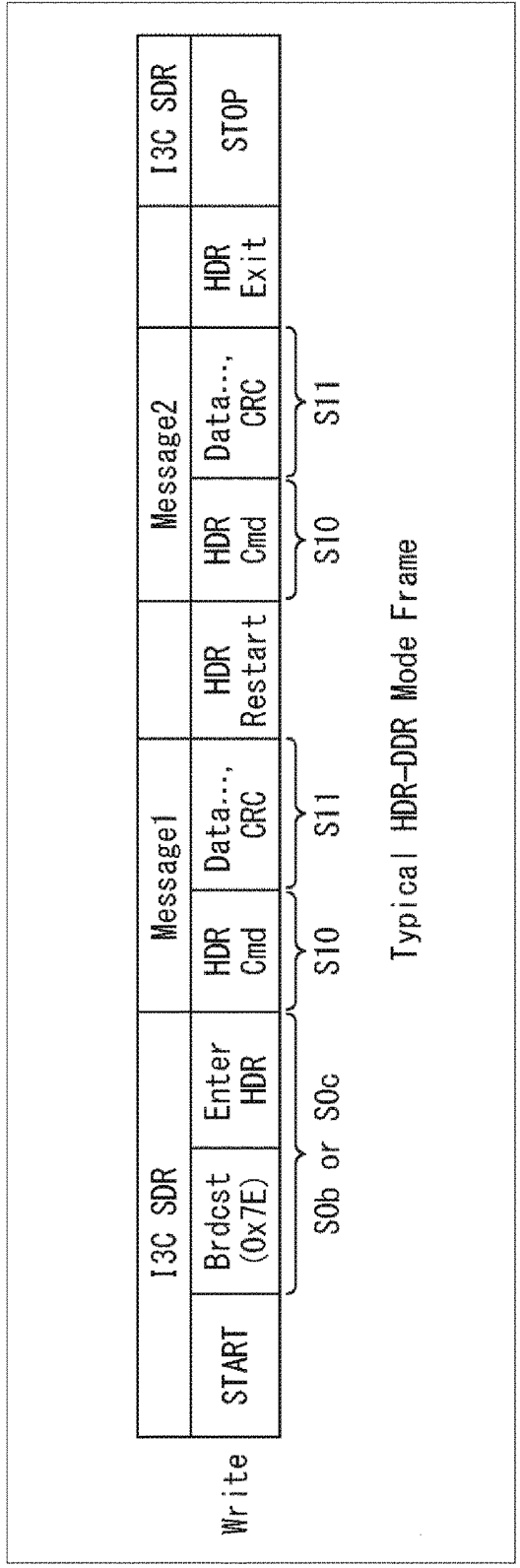
FIG. 11 is a diagram illustrating an error detection method when data write communication is performed in an HDR-DDR mode.

FIG. 11 illustrates an error detection method when data write communication is performed in an HDR-DDR mode.

In such communication, an error that has occurred in two words of the frame transmitted following the start condition can be detected by the error detection method S0b of the slave 13 and the error detection method S0c of the slave 13 described above.

In addition, an error that has occurred in a command word can be detected by a parity check using the error detection method S10 of the slave 13. In addition, an error that has occurred in a data word can be detected by a parity check or a cyclic redundancy check (CRC) using the error detection method S11 of the slave 13.

Figure 12:
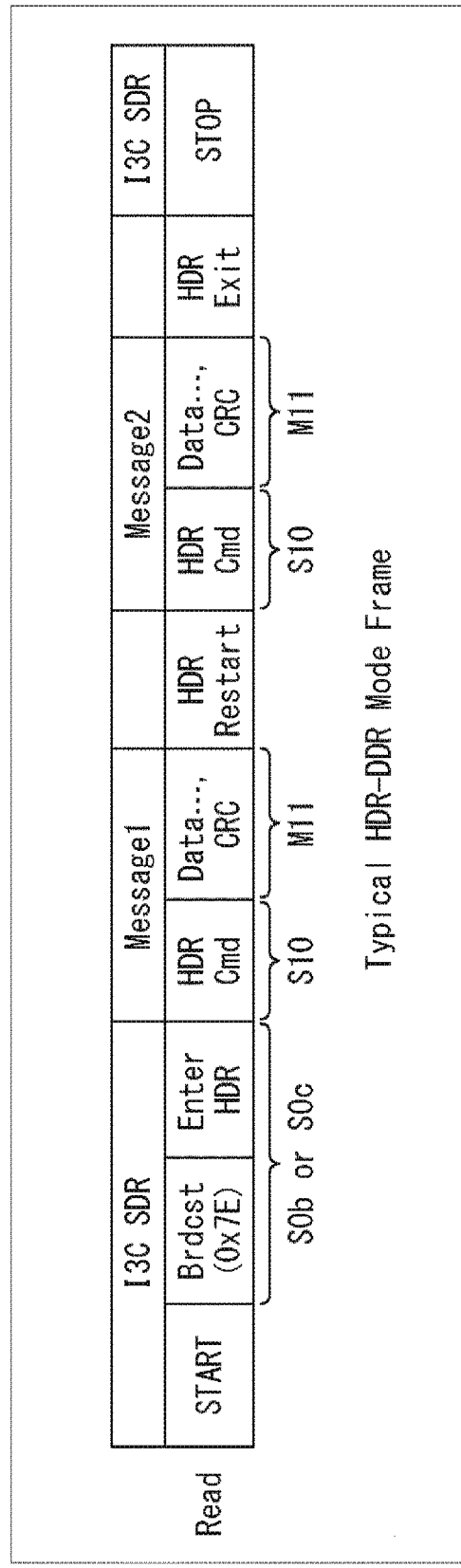
FIG. 12 is a diagram illustrating an error detection method when data read communication is performed in the HDR-DDR mode.

FIG. 12 illustrates an error detection method when data read communication is performed in the HDR-DDR mode.

In such communication, an error that has occurred in two words of the frame transmitted following the start condition can be detected by the error detection method S0b of the slave 13 and the error detection method S0c of the slave 13 described above.

In addition, an error that has occurred in a command word can be detected by a parity check using the error detection method S10 of the slave 13. Therefore, an error that has occurred in a data word can be detected by a parity check or a cyclic redundancy check (CRC) using an error detection method M11 of the master 12.

Figure 13:
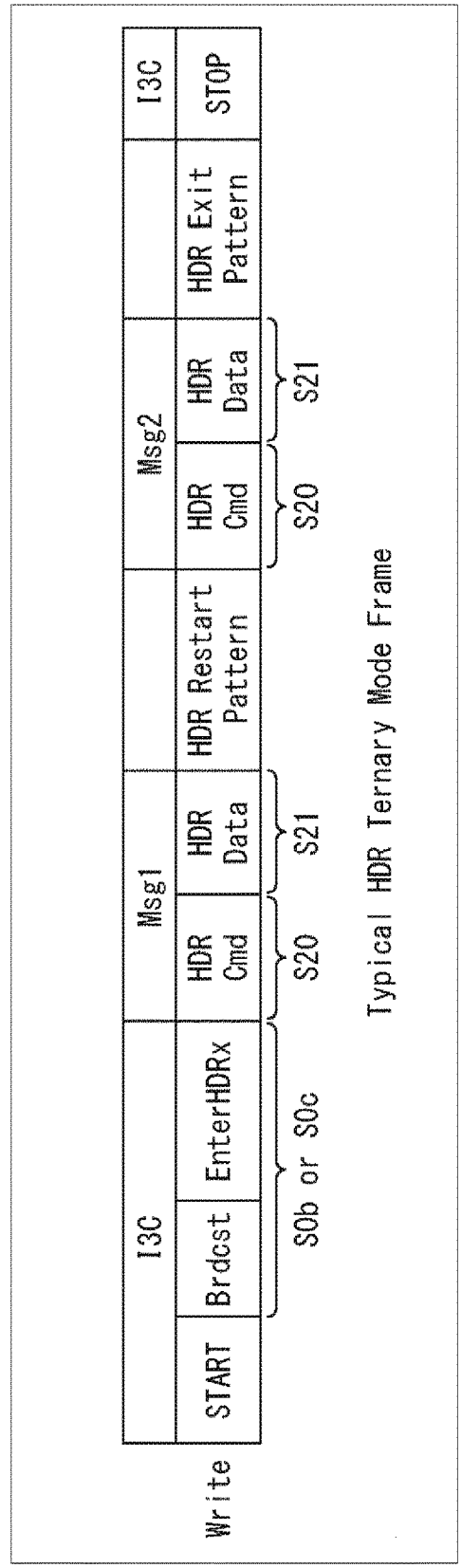
FIG. 13 is a diagram illustrating an error detection method when data write communication is performed in an HDR-TSL/TSP.

FIG. 13 illustrates an error detection method when data write communication is performed in the HDR-TSL/TSP.

In such communication, an error that has occurred in two words of the frame transmitted following the start condition can be detected by the error detection method S0b of the slave 13 and the error detection method S0c of the slave 13 described above.

In addition, by the error detection method S20 of the slave 13, an error that has occurred in a command word can be detected by a symbol of "2" that is shown two consecutive times. That is, in Ternary Encoding used in the HDR-TSL and HDR-TSP, a case in which a symbol of "2" is shown two consecutive times is only found in HDR Restart and HDR Exit, and thus it can be considered as an error. In addition, by the error detection method S21 of the slave 13, an error that has occurred in a data word can be detected by a parity check or a symbol of "2" that is shown two consecutive times (other than HDR Restart or HDR Exit).

Figure 14:
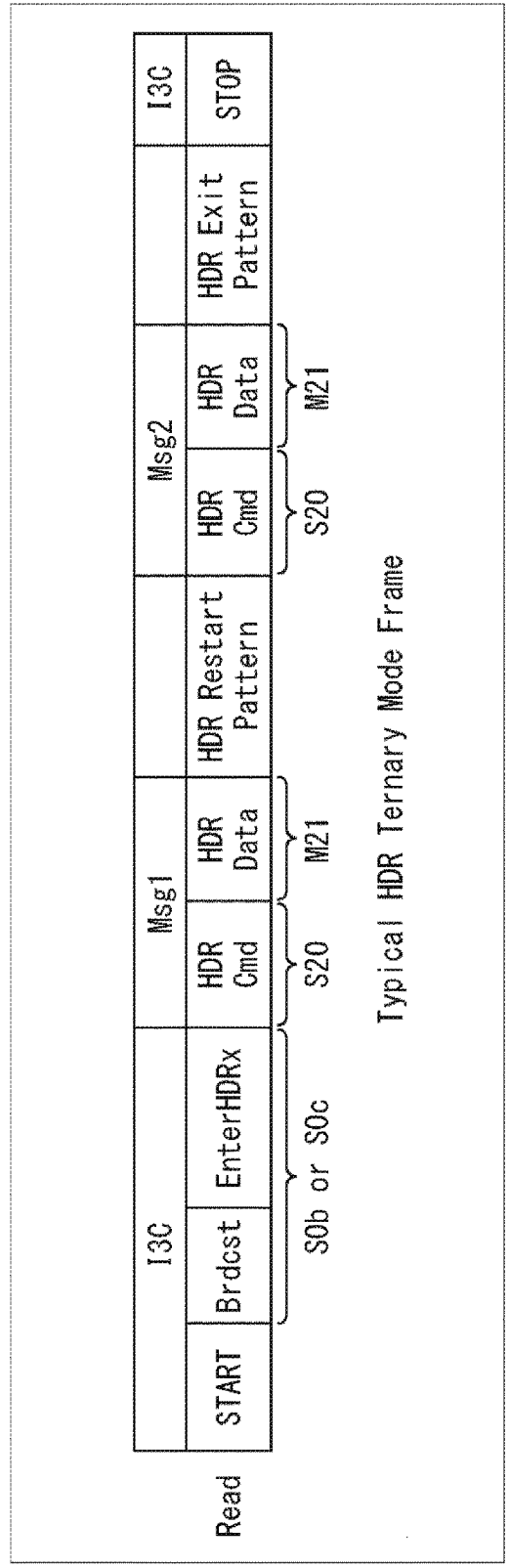
FIG. 14 is a diagram illustrating an error detection method when data read communication is performed in the HDR-TSL/TSP.

FIG. 14 illustrates an error detection method when data read communication is performed in the HDR-TSL/TSP.

In such communication, an error that has occurred in two words of the frame transmitted following the start condition can be detected by the error detection method S0b of the slave 13 and the error detection method S0c of the slave 13 described above.

In addition, by the error detection method S20 of the slave 13, it is possible to detect an error that has occurred in a command word by a symbol of "2" that is shown two consecutive times. In addition, by an error detection method M21 of the master 12, an error that has occurred in a data word can be detected by a parity check or a symbol of "2" that is shown two consecutive times (other than HDR Restart or HDR Exit).

Figure 15:
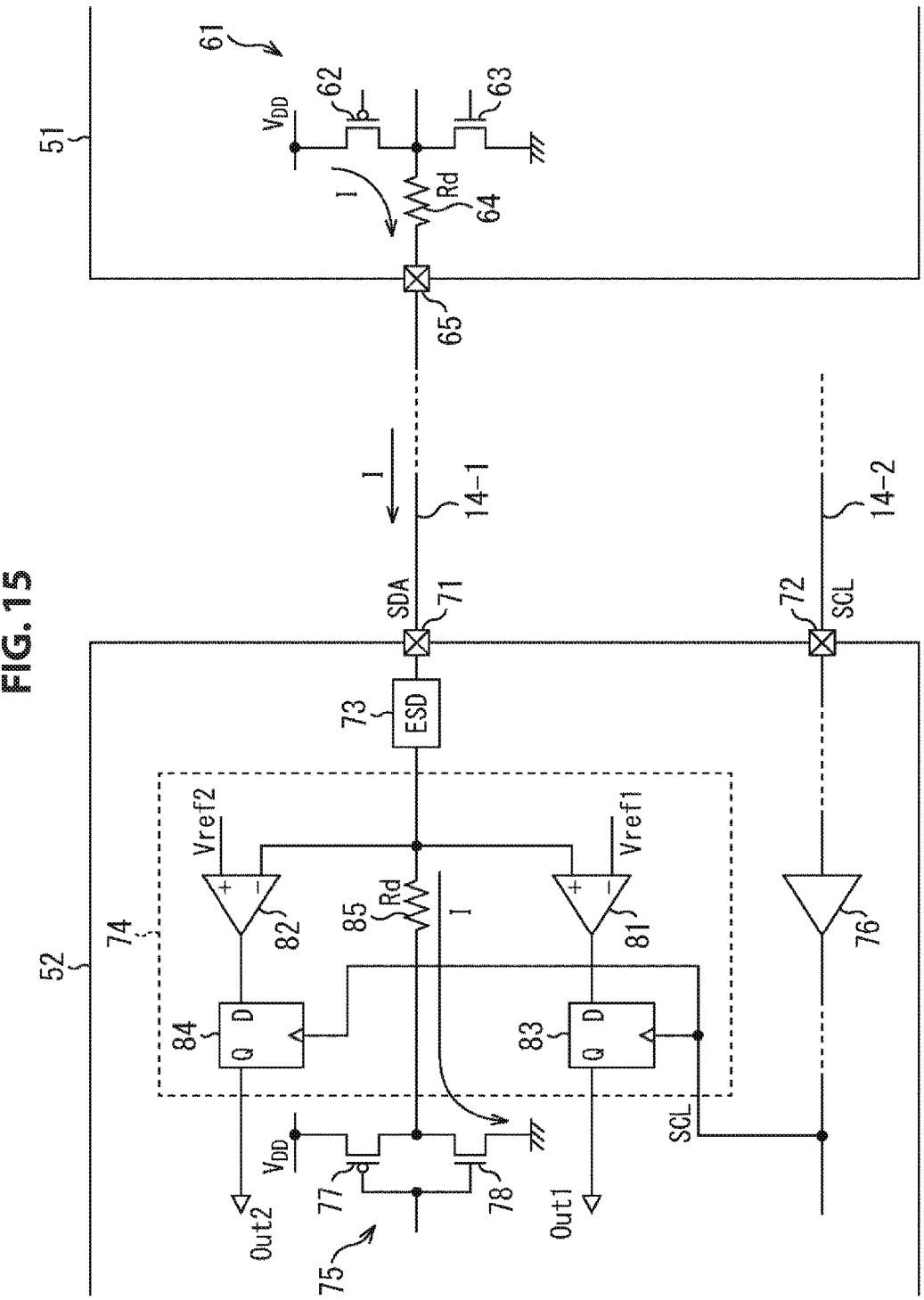
FIG. 15 is a diagram describing a collision detection circuit.

Next, FIG. 15 is a diagram describing a collision detection circuit used in the sixth error detection method performed by the slave 13 and the third error detection method performed by the master 12.

For example, the transmitting and receiving unit 21 of the master 12 and the transmitting and receiving unit 31 of the slave 13 illustrated in FIG. 1 each include a reception circuit 51 and a transmission circuit 52. That is, FIG. 15 illustrates the transmission circuit 52 when one of the transmitting and receiving unit 21 and the transmitting and receiving unit 31 is set as a side from which to transmit a signal and the reception circuit 51 in which the other is set as a side at which to receive a signal.

The reception circuit 51 includes a current source circuit 61. The current source circuit 61 includes a combination of a PMOS transistor 62, an NMOS transistor 63, and a resistor 64. In the current source circuit 61, according to a current I flowing in the resistor 64 from a drain power source $V_{DD}$ through the PMOS transistor 62, serial data (SDA) is transmitted to the signal line 14-1 connected to a terminal 65.

In the transmission circuit 52, the signal line 14-1 through which serial data (SDA) is transmitted is connected to a terminal 71. The signal line 14-2 through which a serial clock (SCL) is transmitted is connected to a terminal 72. In addition, the transmission circuit 52 includes an electrostatic discharge (ESD) element 73, the collision detection circuit 74, an inverter circuit 75, and an amplification unit 76. The inverter circuit 75 includes a combination of a PMOS transistor 77 and an NMOS transistor 78.

For example, the current I input to the transmission circuit 52 through the terminal 71 is supplied to the collision detection circuit 74 through the electrostatic discharge element 73 configured to protect a circuit from a high voltage due to static electricity. In addition, the serial clock (SCL) input to the transmission circuit 52 through the terminal 72 is amplified to a predetermined voltage by the amplification unit 76 and supplied to the collision detection circuit 74. In addition, the current I output from the collision detection circuit 74 flows at a ground level through the NMOS transistor 78 of the inverter circuit 75.

The collision detection circuit 74 includes a combination of comparators 81 and 82, flip flop circuits 83 and 84, and a resistor 85.

As illustrated in FIG. 15, the electrostatic discharge element 73 is connected to a point at which an input terminal on a plus side of the comparator 81 and an input terminal on a minus side of the comparator 82 are connected. One end of the resistor 85 is connected to the connection point. In addition, the other end of the resistor 85 is connected to the inverter circuit 75.

A reference signal Vref1 is supplied to an input terminal on a minus side of the comparator 81, and an output terminal of the comparator 81 is connected to the flip flop circuit 83. In addition, the serial clock (SCL) is supplied to the flip flop circuit 83, and a signal output from the flip flop circuit 83 is set as an output signal Out1.

Similarly, a reference signal Vref2 is supplied to an input terminal on a plus side of the comparator 82, and an output terminal of the comparator 81 is connected to the flip flop circuit 84. In addition, the serial clock (SCL) is supplied to the flip flop circuit 84, and a signal output from the flip flop circuit 84 is set as an output signal Out2.

When the collision detection circuit 74 is configured in this manner and the error detection unit 22 and the error detection unit 32 monitor the output signal Out1, it is possible to detect collision with high accuracy.

Also, while it is necessary to confirm a detection result of the master 12 and the slave 13 in the collision detection method using a digital scheme described above, the master 12 and the slave 13 can independently detect collision in a collision detection method using the collision detection circuit 74.

Figure 16:
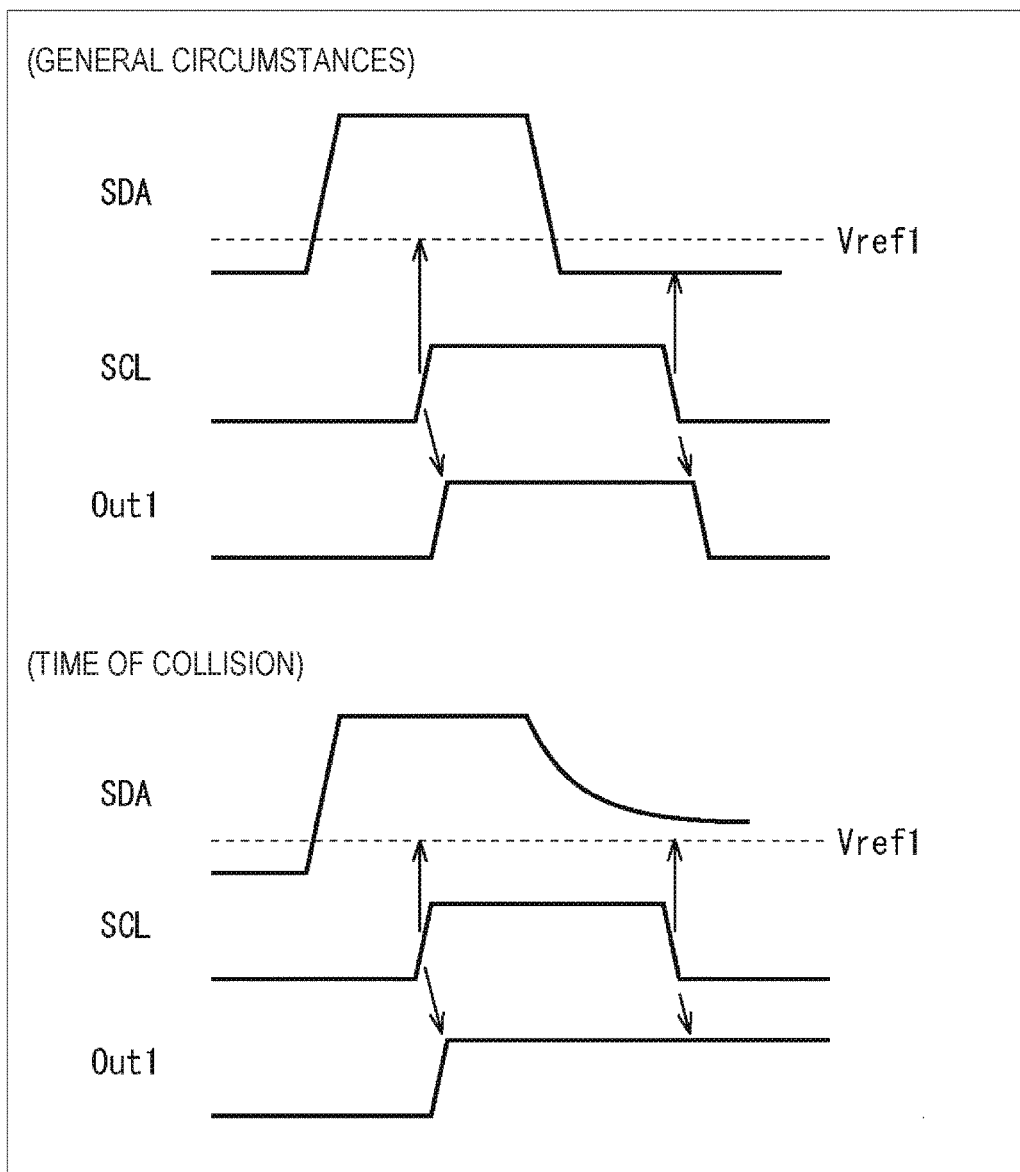
FIG. 16 is a diagram illustrating an example in which a current is changed under general circumstances and at the time of collision.

Operations of the collision detection circuit 74 will be described with reference to an example in which a current is changed under general circumstances and at the time of collision illustrated in FIG. 16.

For example, in general, a 4 mA driver is assumed to be used, and a resistor value Rd of the resistor 64 and the resistor 85 is set to about 20 Ω. In this case, when collision occurs, a voltage of 80 mV or higher is generated in the signal line 14-1 through which the serial data (SDA) is transmitted.

On the other hand, since a voltage of the signal line 14-1 is about 0 V when there is no collision, the reference signal Vref1 is set to about 40 mV, and the comparator 81 performs comparison. Therefore, the flip flop circuit 83 latches a comparison result of the comparator 81 with the serial clock (SCL), and the output signal Out1 becomes a Hi level.

Here, since an expected value is known to be its own output (in this case, a low level), when the output signal Out1 is not the expected value, it is possible to detect collision.

Figure 17:
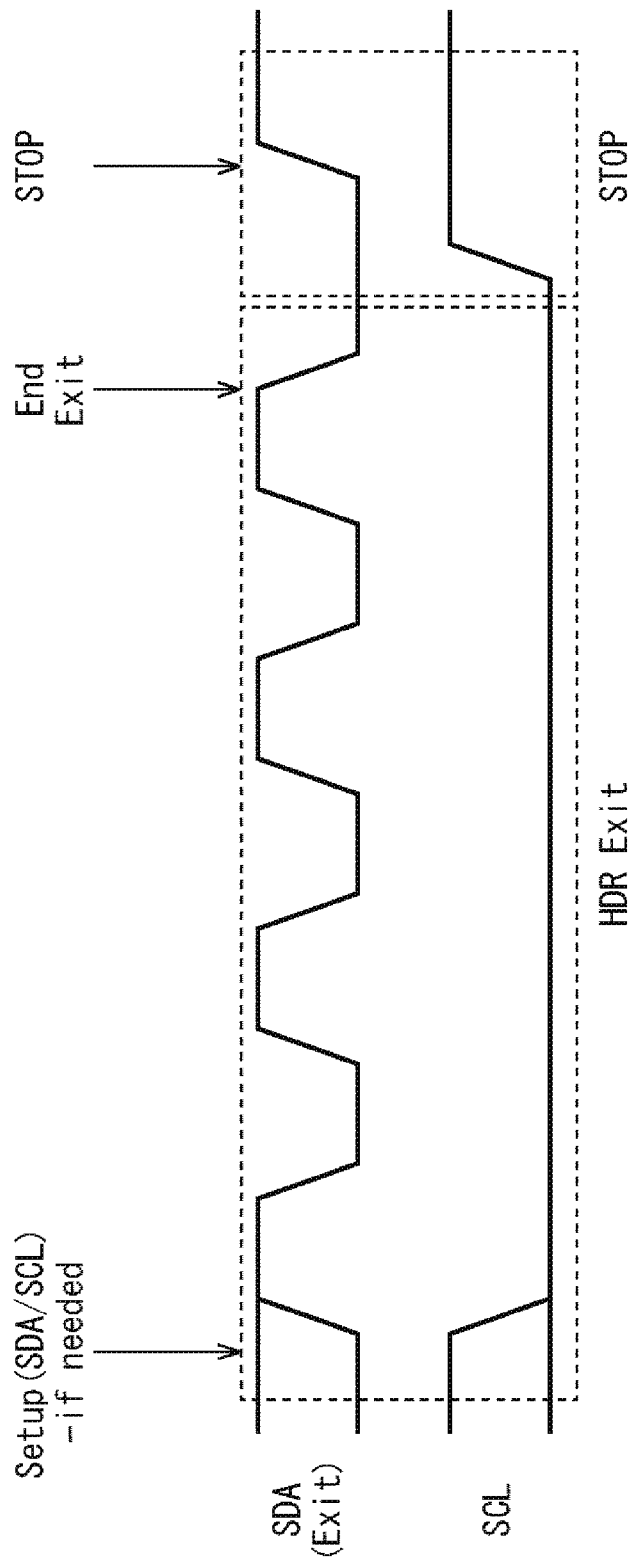
FIG. 17 is a diagram describing transmission of an HDR exit command and a stop condition.

Next, FIG. 17 illustrates the serial data (SDA) and the serial clock (SCL) when the HDR exit command (HDR Exit) and the stop condition P are output.

For example, if there is no reaction when the master 12 performs read access on the slave 13, and there is no reaction when retransmission is performed several times, it can be determined that the slave 13 is in a state in which detection of the HDR exit command (HDR Exit) or detection of the stop condition P is awaited due to some errors. In this case, the master 12 transmits a signal including the HDR exit command (HDR Exit) and the stop condition P as illustrated in FIG. 17 to the slave 13.

Here, the HDR exit command (HDR Exit) and the stop condition P are generally defined to be transmitted at the end of the HDR signal. If transmission is performed when the slave 13 has no reaction, even if it is not at the end of such an HDR signal, it is possible to operate the slave 13 normally.

Note that the master 12 may transmit the signal including the HDR exit command (HDR Exit) and the stop condition P, and may transmit, for example, the start condition S, the HDR exit command (HDR Exit), and the stop condition P. In addition, the master 12 may transmit the start condition S, a broadcast command (0x7E+R/W(=0)), the ACK, the HDR exit command (HDR Exit), and the stop condition P. Accordingly, the slave 13 can be reliably restored.

Figure 18:
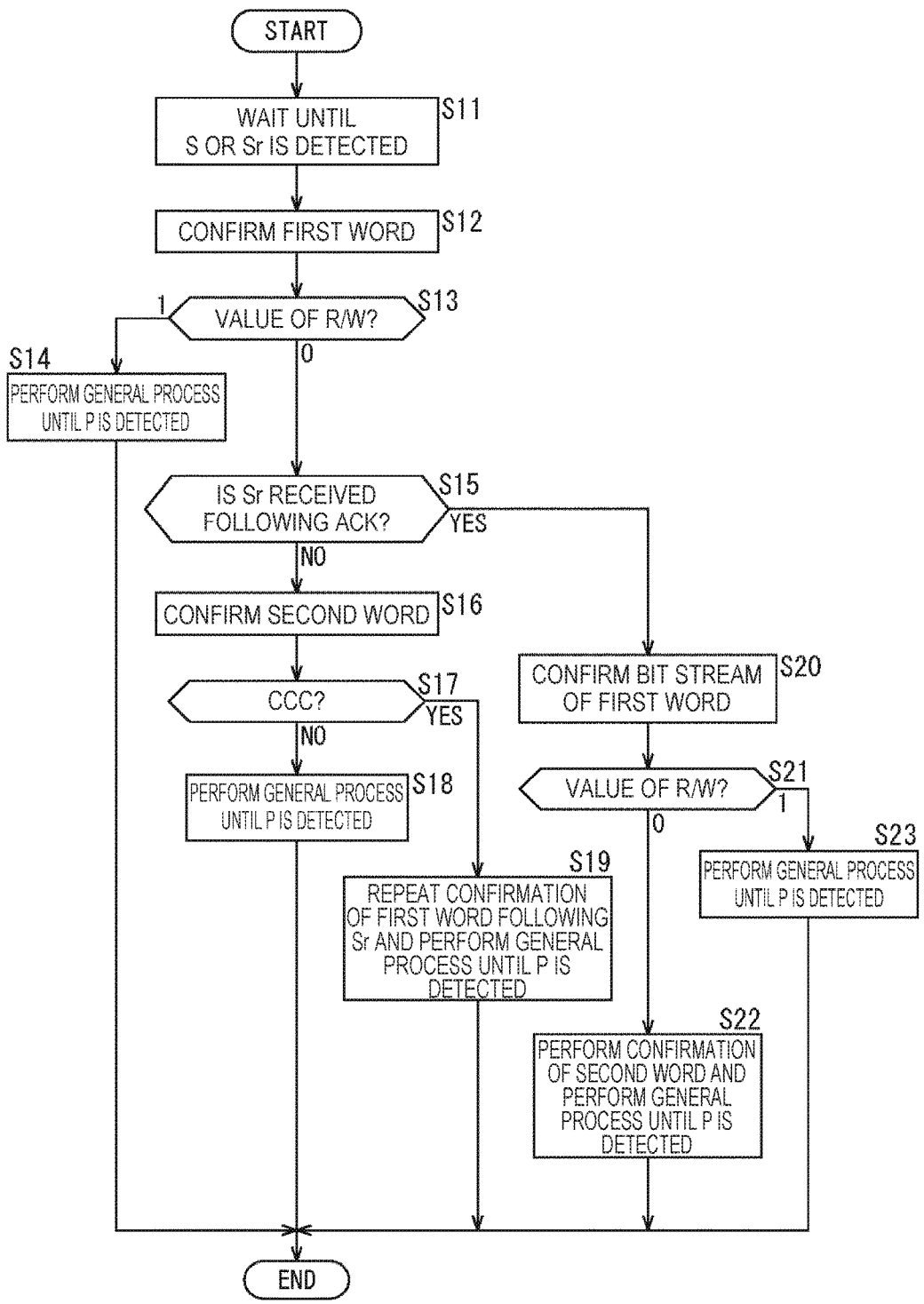
FIG. 18 is a flowchart describing an error detection process performed in the slave.

Next, FIG. 18 is a flowchart describing the error detection method S0*b* among error detection processes performed in the slave 13.

For example, when the slave 13 is activated, the process starts. In Step S11, the transmitting and receiving unit 31 waits until the master 12 outputs the start condition S or Sr and the output is detected. Therefore, when the transmitting and receiving unit 31 detects the start condition S or Sr, the process advances to Step S12.

In Step S12, the error detection unit 32 confirms a first word of a frame head received by the transmitting and receiving unit 31.

In Step S13, the error detection unit 32 determines whether one bit (R/W) indicating a data read or write request included in the first word has a value of 1 or 0 based on the confirmation result in Step S12.

In Step S13, when the error detection unit 32 determines that the value of one bit (R/W) indicating a data read or write request is 1 that indicates data read, the process advances to Step S14. That is, in this case, as described above, an error in the first word of the frame head is detected.

In Step S14, the slave 13 performs a general process until the transmitting and receiving unit 31 detects the stop condition P. Also, in this case, Private Read (without 0x7E) is set.

On the other hand, in Step S13, when the error detection unit 32 determines that the value of one bit (R/W) indicating a data read or write request is 0 that indicates data write, the process advances to Step S15.

In Step S15, the error detection unit 32 determines whether the transmitting and receiving unit 31 has received repeat start Sr following the ACK of the first word.

In Step S15, when the error detection unit 32 determines that the transmitting and receiving unit 31 did not receive the repeat start Sr following the ACK of the first word, the process advances to Step S16.

In Step S16, the error detection unit 32 confirms a second word from the frame head. In Step S17, it is determined whether the second word is a common command code (CCC).

In Step S17, when the error detection unit 32 determines that the second word is not the common command code, the process advances to Step S18, and the slave 13 performs a general process until the transmitting and receiving unit 31 detects the stop condition P. Also, in this case, Private Write (without 0x7E) is set.

On the other hand, in Step S17, when the error detection unit 32 determines that the second word is the common command code, the process advances to Step S19. In Step S19, the error detection unit 32 repeats confirmation of the first word following the repeat start Sr and performs a general process until the transmitting and receiving unit 31 detects the stop condition P.

On the other hand, in Step S15, when the error detection unit 32 determines that the transmitting and receiving unit 31 has received the repeat start Sr following the ACK of the first word, the process advances to Step S20.

In Step S20, the error detection unit 32 confirms the first word following the repeat start Sr received by the transmitting and receiving unit 31.

In Step S21, the error detection unit 32 determines whether one bit (R/W) indicating a data read or write request included in the first word has a value of 1 or 0 based on the confirmation result in Step S12.

In Step S21, when the error detection unit 32 determines that the value of one bit (R/W) indicating a data read or write request is 0 that indicates data write, the process advances to Step S22.

In Step S22, the error detection unit 32 confirms a second word and performs a general process until the transmitting and receiving unit 31 detects the stop condition P. Also, in this case, Private Write (with 0x7E) is set.

On the other hand, in Step S21, when the error detection unit 32 determines that the value of one bit (R/W) indicating a data read or write request is 1 that indicates data read, the process advances to Step S23.

In Step S23, the slave 13 performs a general process until the transmitting and receiving unit 31 detects the stop condition P. Also, in this case, Private Read (with 0x7E) is set.

Also, an embodiment of the present technology is not limited to the bus IF 11 according to a standard I2C, but can be applied to the bus IF 11 according to the other standards. In addition, in the bus IF 11 illustrated in FIG. 1, an exemplary configuration in which the slaves 13-1 to 13-3 are connected is illustrated. However, for example, one, two, three or more slaves 13 may be connected. Further, for example, the bus IF 11 may use both transmission of an error correction code for correcting an error that has occurred in a common command code and confirmation of whether reception is successful using a parity check result in combination.

Note that the processes described with reference to the above flowcharts are not necessarily performed in time series according to sequences described in the flowchart, but include processes (for example, parallel processes or processes by an object) that are performed in parallel or individually. In addition, a program may be processed by one CPU or may be processed by a plurality of CPUs in a distributed manner.

In addition, the series of processes described above can be performed by hardware or software. When the series of processes are performed by the software, a program of the software is installed in a computer embedded in dedicated hardware or installed in, for example, a general-purpose personal computer in which various programs can be installed to perform various functions from a program recording medium in which a program is recorded.

<Exemplary Configuration of Hardware>

Figure 19:
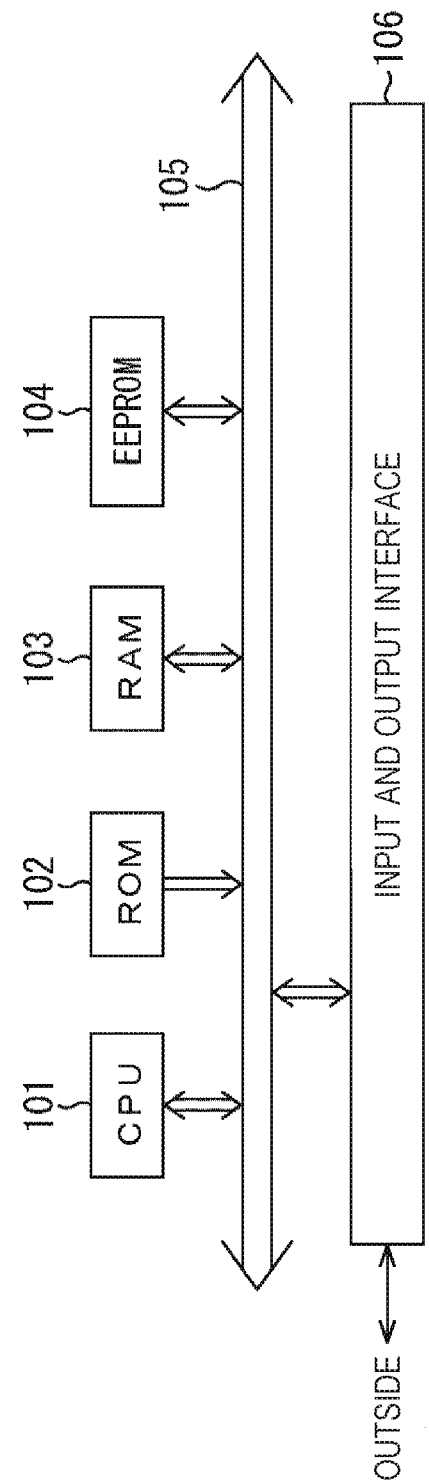
FIG. 19 is a block diagram illustrating an exemplary configuration of an embodiment of a computer to which the present technology is applied.

FIG. 19 is a block diagram illustrating an exemplary configuration of hardware of a computer causing a program to execute the series of processes described above.

In the computer, a central processing unit (CPU) 101, a read only memory (ROM) 102, a random access memory (RAM) 103, and an electronically erasable and programmable read only memory (EEPROM) 104 are connected to one another through a bus 105. To the bus 105, an input and output interface 106 is further connected, and the input and output interface 106 is connected to the outside (for example, the signal lines 14-1 and 14-2 of FIG. 1).

In the computer configured as described above, the CPU 101 loads and executes the program stored in, for example, the ROM 102 and the EEPROM 104, in the RAM 103 through the bus 105, and thus the series of processes described above are performed. In addition, the program executed by the computer (the CPU 101) may be written in advance in the ROM 102, or installed and updated in the EEPROM 104 from the outside through the input and output interface 106.

Additionally, the present technology may also be configured as below.

(1) A communication device that performs communication through a bus, including:

a transmitting and receiving unit configured to transmit and receive a signal to and from at least one other communication device; and an error detection unit configured to, when the transmitting and receiving unit transmits and receives the signal, detect whether an error has occurred in the signal using a specific error detection method according to transmission and reception of the signal, wherein the signal is transmitted and received between a first communication device, which is the communication device having a communication initiative through the bus, and a second communication device, which is the communication device configured to perform communication under control of the first communication device, and wherein, when one bit indicating a data read or write request, which is transmitted together with a broadcast command for notifying of simultaneous transmission of a command to all of a plurality of the second communication devices as a target, indicates data read in a first word of a head in a frame transmitted after the first communication device starts communication, the error detection unit of the second communication device detects that an error has occurred in the first word.

(2) The communication device according to (1), wherein the first communication device sets a parity bit transmitted following a second word of the frame so that two words from the head of the frame are included in an error detection target using the parity bit.

(3) The communication device according to (2),
wherein the error detection unit of the second communication device uses an error detection method in which a parity bit transmitted following a second word from the head of the frame is used to perform a parity check on a bit stream of two words from the head of the frame and detects an error that has occurred in the two words.

(4) The communication device according to any of (1) to (3),
wherein the error detection unit of the second communication device uses an error detection method in which it is confirmed whether, in one word transmitted immediately after communication is continuously re-started without terminating communication, a bit stream predefined to be transmitted as the one word is arranged after dynamic address assignment is fixed until communication termination is detected and detects an error that has occurred in the one word.

(5) The communication device according to any of (1) to (4),
wherein the error detection unit uses an error detection method in which it is confirmed whether a format of data transmitted after a transaction of transmitting a common command code to a plurality of the other communication devices is fixed is different from a predefined format and detects an error that has occurred in the data.

(6) The communication device according to any of (1) to (5),
wherein the error detection unit of the second communication device uses an error detection method in which, at a timing at which a signal is delivered from the second communication device, it is constantly monitored whether the delivered signal matches a signal on the bus and detects an error that has occurred in the signal.

(7) The communication device according to any of (1) to (6), further including
a current monitoring circuit configured to monitor a current flowing in a signal line configured to output a signal from the communication device,
wherein the error detection unit uses an error detection method in which, at a timing at which a signal from the communication device itself is delivered, it is confirmed whether the delivered signal matches a signal on the bus based on a current that is constantly monitored by the current monitoring circuit and detects an error that has occurred in the signal.

(8) A communication method performed by a communication device configured to perform communication through a bus,
wherein the communication device includes
a transmitting and receiving unit configured to transmit and receive a signal to and from at least one other communication device, and
an error detection unit configured to, when the transmitting and receiving unit transmits and receives the signal, detect whether an error has occurred in the signal using a specific error detection method according to transmission and reception of the signal
the communication method including:
transmitting and receiving the signal between a first communication device, which is the communication device having a communication initiative through the bus, and a second communication device, which is the communication device configured to perform communication under control of the first communication device; and
when one bit indicating a data read or write request, which is transmitted together with a broadcast command for notifying of simultaneous transmission of a command to all of a plurality of the second communication devices as a target, indicates data read in a first word of a head in a frame transmitted after the first communication device starts communication, detecting by the error detection unit of the second communication device that an error has occurred in the first word.

(9) A program causing a computer of a communication device configured to perform communication through a bus to execute operations,
wherein the communication device includes
a transmitting and receiving unit configured to transmit and receive a signal to and from at least one other communication device, and
an error detection unit configured to, when the transmitting and receiving unit transmits and receives the signal, detect whether an error has occurred in the signal using a specific error detection method according to transmission and reception of the signal, and
wherein the operations include
transmitting and receiving the signal between a first communication device, which is the communication device having a communication initiative through the bus, and a second communication device, which is the communication device configured to perform communication under control of the first communication device, and
when one bit indicating a data read or write request, which is transmitted together with a broadcast command for notifying of simultaneous transmission of a command to all of a plurality of the second communication devices as a target, indicates data read in a first word of a head in a frame transmitted after the first communication device starts communication, detecting by the error detection unit of the second communication device that an error has occurred in the first word.

(10) A communication system in which a plurality of communication devices perform communication through a bus,
wherein the communication devices each include
a transmitting and receiving unit configured to transmit and receive a signal to and from at least one other communication device, and
an error detection unit configured to, when the transmitting and receiving unit transmits and receives the signal, detect whether an error has occurred in the signal using a specific error detection method according to transmission and reception of the signal,
wherein the signal is transmitted and received between a first communication device, which is the communication device having a communication initiative through the bus, and a second communication device, which is the communication device configured to perform communication under control of the first communication device, and
wherein, when one bit indicating a data read or write request, which is transmitted together with a broadcast command for notifying of simultaneous transmission of a command to all of a plurality of the second communication devices as a target, indicates data read in a first word of a head in a frame transmitted after the first communication device starts communication, the error detection unit of the second communication device detects that an error has occurred in the first word.

Note that the present embodiment is not limited to the embodiments described above, and various modifications without departing from the spirit and scope of the present disclosure can be implemented.

What is claim is:

1. A slave communication device configured to perform communication through a bus, comprising:
   transmitting and receiving circuitry configured to transmit and receive a signal to and from a master communication device; and
   error detection circuitry configured to detect whether an error has occurred in the signal, wherein:
   in one word received immediately after a continuous re-start is received, the error detection circuitry is configured to confirm whether a predefined bit stream exists,
   in a case where the predefined bit stream does not exist in the one word, the error detection circuitry is configured to detect that an error has occurred in the one word, and
   the continuous re-start is a pattern that indicates that communication of the signal is continuously restarted but not terminated, and the continuous re-start pattern is received after a command to enter a dynamic address assignment (ENTDAA) procedure is received and before the ENTDAA procedure is terminated.

2. The slave communication device according to claim 1, wherein the error detection circuitry is configured to perform an error detection in which:
   at a timing at which a signal is delivered from the master communication device, it is constantly monitored whether the delivered signal matches a signal on the bus, and
   in a case where the delivered signal does not match the signal on the bus, the error detection circuitry is configured to detect that an error has occurred in the signal.

3. The slave communication device according to claim 1, wherein
   a sequentially-first word of a frame of the signal includes a broadcast command for notifying of simultaneous transmission of a command from the master communication device and a one-bit read/write indicator and, in a case where the one-bit read/write indicator indicates data read after the master communication device starts communication, the error detection circuitry is configured to detect that an error has occurred in the sequentially-first word, and
   a sequentially-second word of the frame of the signal includes an ENTDAA common command code.

4. The slave communication device according to claim 1, wherein
   a sequentially-first word of a frame of the signal includes a broadcast command from the master communication device followed by a one-bit read/write indicator, and
   the broadcast command is transmitted from the master communication device to notify of simultaneous transmission of a command to the slave communication device as a target.

5. The slave communication device according to claim 1, wherein a sequentially-first word of a frame of the signal includes a broadcast command from the master communication device followed by a one-bit read/write indicator.

6. The slave communication device according to claim 5, wherein a word length of the frame is 9 bits.

7. The slave communication device according to claim 5, wherein the sequentially-first word includes an acknowledge bit.

8. The slave communication device according to claim 5, wherein the sequentially-first word does not include a start condition bit.

9. The slave communication device according to claim 5, wherein the broadcast command consists of 7 bits.

10. The slave communication device according to claim 5, wherein the broadcast command is 0x7E.

11. The slave communication device according to claim 1, wherein the ENTDAA procedure is terminated in a case where a stop condition is received from the master communication device.

12. A master communication device configured to perform communication through a bus, comprising:
    transmitting and receiving circuitry configured to transmit and receive a signal to and from a slave communication device,
    wherein the slave communication device includes error detection circuitry configured to, when the transmitting and receiving circuitry transmits the signal, detect whether an error has occurred in the signal by performing a particular error detection, in which:
    in one word transmitted immediately after a continuous re-start is transmitted, the error detection circuitry is configured to monitor an acknowledgment bit to confirm whether a predefined bit stream exists, and
    in a case where the predefined bit stream does not exist in the one word, the error detection circuitry is configured to detect that an error has occurred in the one word,
    wherein the continuous re-start is a pattern that indicates that communication of the signal is continuously restarted but not terminated, and the continuous re-start pattern is transmitted after dynamic address assignment is detected and before communication of the signal is terminated.

13. A communication method performed by a slave communication device configured to perform communication through a bus, wherein the slave communication device includes transmitting and receiving circuitry configured to transmit and receive a signal to and from a master communication device, and error detection circuitry, the communication method comprising:
    transmitting and receiving the signal between the slave communication device and the master communication device; and
    detecting whether an error has occurred in the signal using a particular error detection method, in which:
    in one word received immediately after a continuous re-start is received, the error detection circuitry is configured to confirm whether a predefined bit stream exists, and
    in a case where the predefined bit stream does not exist in the one word, the error detection circuitry is configured to detect that an error has occurred in the one word,
    wherein the continuous re-start is a pattern that indicates that communication of the signal is continuously restarted but not terminated, and the continuous re-start pattern is received after dynamic address assignment is detected and before communication of the signal is terminated.

14. The communication method according to claim 13, wherein the error detection circuitry is configured to perform an error detection in which:
    at a timing at which a signal is delivered from the master communication device, it is constantly monitored whether the delivered signal matches a signal on the bus, and
    in a case where the delivered signal does not match the signal on the bus, the error detection circuitry is configured to detect that an error has occurred in the signal.

15. The communication method according to claim 13, wherein
- a sequentially-first word of a frame of the signal includes a broadcast command for notifying of simultaneous transmission of a command from the master communication device and a one-bit read/write indicator and, in a case where the one-bit read/write indicator indicates data read after the master communication device starts communication, the error detection circuitry is configured to detect that an error has occurred in the sequentially-first word, and
- a sequentially-second word of the frame of the signal includes an ENTDAA common command code.

16. The communication method according to claim 13, wherein
- a sequentially-first word of a frame of the signal includes a broadcast command from the master communication device followed by a one-bit read/write indicator, and the broadcast command is transmitted from the master communication device to notify of simultaneous transmission of a command to the slave communication device as a target.

17. The communication method according to claim 13, wherein a sequentially-first word of a frame of the signal includes a broadcast command from the master communication device followed by a one-bit read/write indicator.

18. The communication method according to claim 17, wherein a word length of the frame is 9 bits.

19. The communication method according to claim 17, wherein the sequentially-first word includes an acknowledge bit.

20. The communication method according to claim 17, wherein the broadcast command consists of 7 bits.

21. The communication method according to claim 17, wherein the broadcast command is 0x7E.

* * * * *